(12) United States Patent
Nishikawa et al.

(10) Patent No.: US 11,698,960 B2
(45) Date of Patent: Jul. 11, 2023

(54) MANAGEMENT APPARATUS, MANAGEMENT METHOD, AND STORAGE MEDIUM

(71) Applicant: NEC Corporation, Tokyo (JP)

(72) Inventors: Tomoki Nishikawa, Tokyo (JP);
Kazuhiko Kimura, Tokyo (JP);
Shunichi Kinoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 254 days.

(21) Appl. No.: 16/975,941

(22) PCT Filed: Feb. 27, 2019

(86) PCT No.: PCT/JP2019/007686
§ 371 (c)(1),
(2) Date: Aug. 26, 2020

(87) PCT Pub. No.: WO2019/168066
PCT Pub. Date: Sep. 6, 2019

(65) Prior Publication Data
US 2021/0004455 A1    Jan. 7, 2021

(30) Foreign Application Priority Data
Feb. 28, 2018 (JP) ................. 2018-034790

(51) Int. Cl.
*G06F 21/57* (2013.01)
*G06F 21/51* (2013.01)
*G06F 21/44* (2013.01)

(52) U.S. Cl.
CPC .............. *G06F 21/51* (2013.01); *G06F 21/44* (2013.01); *G06F 21/572* (2013.01); *G06F 21/577* (2013.01); *G06F 2221/033* (2013.01); *G06F 2221/034* (2013.01)

(58) Field of Classification Search
CPC ................... G06F 21/577; G06F 2221/034
See application file for complete search history.

(56) References Cited

U.S. PATENT DOCUMENTS 5,774,651 A    6/1998 Akiyama et al.
2002/0112150 A1* 8/2002 Lawing .............. H04L 41/044
713/1

(Continued)

FOREIGN PATENT DOCUMENTS

JP    H09-91133 A    4/1997
JP    2005-129042 A    5/2005

(Continued)

OTHER PUBLICATIONS

International Search Report for PCT Application No. PCT/JP2019/007686, dated Apr. 9, 2019.

*Primary Examiner* — David J Pearson

(57) ABSTRACT

A management apparatus, a management method, and a storage medium that can appropriately deny an application intended not to change a software configuration of a device are provided. The management apparatus includes: an acceptance unit that accepts, from an applicant, an application intended not to change a software configuration of a device; and a processing unit that denies the application based on the number of times of applications accepted by the acceptance unit.

15 Claims, 18 Drawing Sheets

(56) References Cited

U.S. PATENT DOCUMENTS

| | | | |
|---|---|---|---|
| 2004/0187103 A1* | 9/2004 | Wickham | G06F 8/65 717/174 |
| 2014/0173737 A1* | 6/2014 | Toback | G06F 21/57 726/25 |
| 2018/0375891 A1* | 12/2018 | Juncker | H04L 63/20 |
| 2019/0166149 A1* | 5/2019 | Gerrick | G06Q 10/10 |
| 2019/0245880 A1* | 8/2019 | Ward | H04L 43/0817 |

FOREIGN PATENT DOCUMENTS

| | | |
|---|---|---|
| JP | 2005-227561 A | 8/2005 |
| JP | 2009-032002 A | 2/2009 |
| JP | 4749380 B2 | 8/2011 |
| JP | 4919511 B2 | 4/2012 |
| JP | 2014-006678 A | 1/2014 |
| JP | 5730347 B2 | 6/2015 |

* cited by examiner

FIG. 4B

| Countermeasure Details | | |
|---|---|---|
| Risk ID | CD-5678-000020 | |
| Title | Countermeasure against vulnerability of AAA software | |
| Summary | There is vulnerability that can ... in AAA software. | |
| Target product | AAA software | |
| Details | AAA software is ...<br>If this vulnerability is abused, ... | |

Selection of countermeasure: Permanent countermeasure / Exception application ~504

Details of selected countermeasure ~506

| Description of countermeasure content | Please upgrade AAA software to ver. 1.2.34 or later. |
|---|---|
| Influence point when countermeasure is implemented | To reflect upgrade, restart of application server is required. |
| Related information | |

508 — Implement countermeasure ~510a
Check countermeasure status ~510b
Reason setting ~510c

MANAGEMENT APPARATUS, MANAGEMENT METHOD, AND STORAGE MEDIUM

TECHNICAL FIELD

The present invention relates to a management apparatus, a management method, and a storage medium.

BACKGROUND ART

Patent Literature 1 discloses a computer system management apparatus. The computer system management apparatus disclosed in Patent Literature 1 performs management so that countermeasures required for security of a computer system in which a plurality of computers are connected via a network are reliably taken.

Patent Literature 1 discloses that "install instruction window" of an essential application transmitted from the computer system management apparatus is displayed on the computer side. Furthermore, Patent Literature 1 discloses that, when "install" button in "install instruction window" is not clicked by a user, that is, when "not install" button is clicked, an entry window for inputting a reason for not installing is displayed.

CITATION LIST

Patent Literature

PTL 1: Japanese Patent No. 5730347

SUMMARY OF INVENTION

Technical Problem

The computer system management apparatus disclosed in Patent Literature 1 registers an input reason for not installing in a non-install reason list and, if it is determined that the essential application has not yet been installed, determines whether or not a valid reason has been registered. In the computer management apparatus disclosed in Patent Literature 1, however, since it is only determined whether or not a valid reason has been registered, it is not possible to determine whether or not the entry of the reason is appropriate.

In view of the problem described above, the present invention intends to provide a management apparatus, a management method, and a storage medium that can appropriately deny an application intended not to change the software configuration of a device.

Solution to Problem

According to one example aspect of the present invention, provided is a management apparatus including: an acceptance unit that accepts, from an applicant, an application intended not to change a software configuration of a device; and a processing unit that denies the application based on the number of times of applications accepted by the acceptance unit.

According to another example aspect of the present invention, provided is a management method including: accepting an application intended not to change a software configuration of a device; and denying the application based on the number of times of accepted applications.

According to yet another example aspect of the present invention, provided is a storage medium storing a program that causes a computer to: accept an application intended not to change a software configuration of a device; and deny the application based on the number of times of accepted applications.

Advantageous Effects of Invention

According to the present invention, it is possible to appropriately deny an application intended not to change the software configuration of a device.

BRIEF DESCRIPTION OF DRAWINGS

FIG. 4B is a schematic diagram illustrating an example of a display window in a device targeted by a countermeasure instruction from the management apparatus according to the first example embodiment of the present invention.

DESCRIPTION OF EMBODIMENTS

First Example Embodiment

A management apparatus and a management method according to a first example embodiment of the present invention will be described by using FIG. 1 to FIG. 6.

Figure 1:
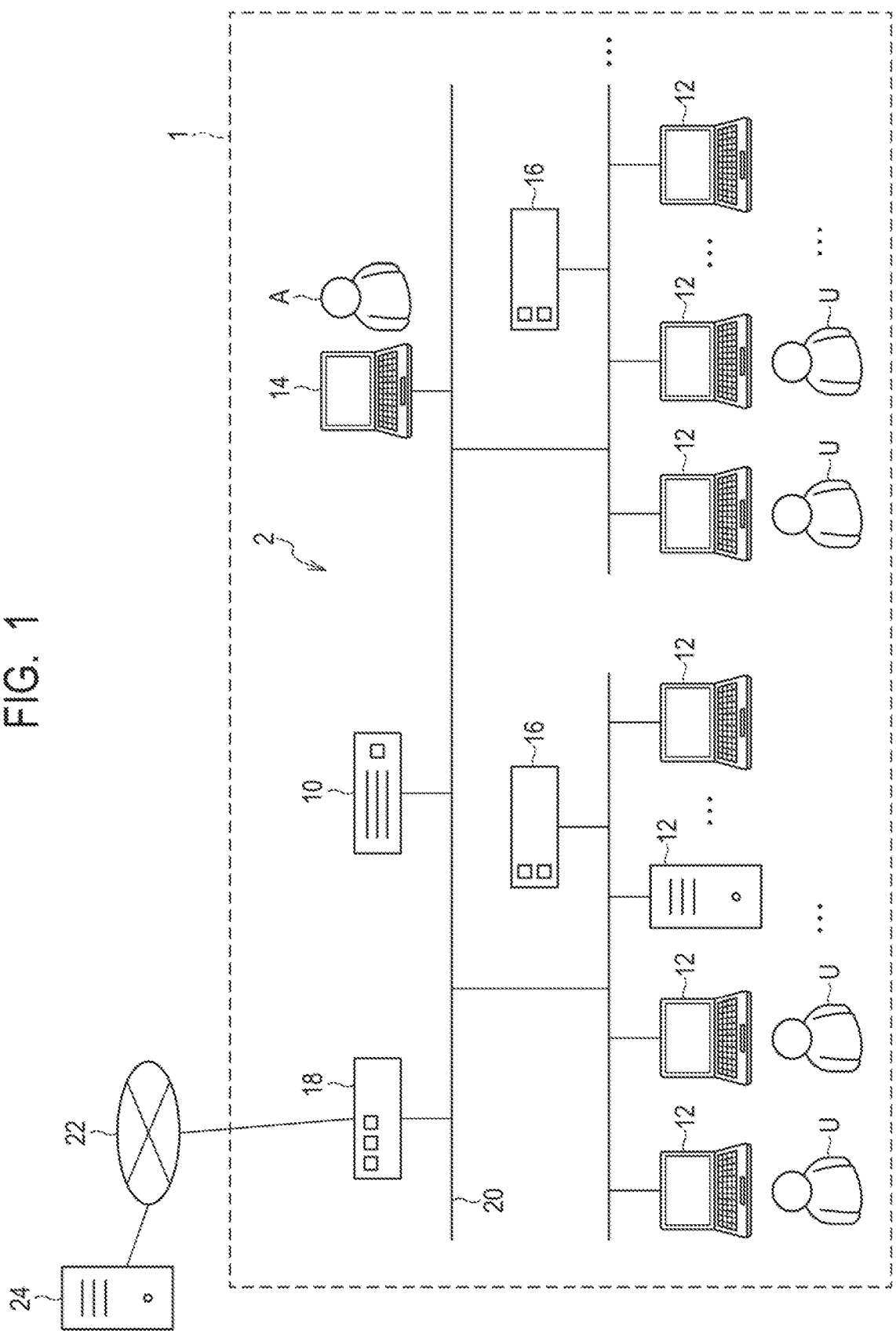
FIG. 1 is a schematic diagram illustrating an example of the overall configuration of a system including a management apparatus and devices to be managed thereby according to a first example embodiment of the present invention.

First, an example of the overall configuration of a system including the management apparatus and devices to be managed thereby according to the present example embodiment will be described with reference to FIG. 1. FIG. 1 is a schematic diagram illustrating an example of the overall configuration of the system including the management apparatus and the devices to be managed thereby according to the present example embodiment.

As illustrated in FIG. 1, a system 2 constructed within an organization 1 such as a company, for example, includes a management apparatus 10 according to the present example embodiment, a plurality of devices 12, a management terminal 14, network disconnecting apparatuses 16, and a firewall/proxy server 18. The management apparatus 10, the plurality of devices 12, the management terminal 14, the network disconnecting apparatuses 16, and the firewall/proxy server 18 are connected so as to be able to communicate with an intra-organization network 20.

The intra-organization network 20 that is an internal network of the organization 1 is connected to the Internet 22 via the firewall/proxy server 18. An information delivery server 24 is connected to the Internet 22 that is an external network to the intra-organization network 20.

The management apparatus 10 according to the present example embodiment is an information processing apparatus that is to manage the plurality of devices 12 used in the organization 1. The management apparatus 10 supports recognition of potential vulnerability in the plurality of devices 12 to be managed and implementation of countermeasures against vulnerability. The management apparatus 10 may be an on-premises type managed and operated by the organization 1 as a facility of the organization 1 or may be a cloud type managed and operated by a company or the like that is a different organization from the organization 1.

Each device 12 is a device used or managed by a user U within the organization 1 and is an information processing device such as a client personal computer (PC), a server, or the like, for example. The user U may be a device administrator that manages one or a plurality of devices 12 in addition to an individual person who uses one or more devices 12.

The plurality of devices 12 may be connected to the same segment in the intra-organization network 20 or may be connected to a plurality of segments different from each other. Note that the device 12 is not necessarily limited to the information processing device such as a client PC, a server, or the like but may be any device that can be connected to the intra-organization network 20.

The management terminal 14 is an information processing terminal used by an administrator A who manages security of the system 2 within the organization 1. The administrator A may perform setting and operation of the management apparatus 10 and confirm a result of a process performed by the management apparatus 10 via the management terminal 14. Further, the administrator A may receive a notification from the management apparatus 10 via the management terminal 14.

Each network disconnecting apparatus 16 is a network device that disconnects the network communication of a particular device in accordance with an instruction from the management apparatus 10. For example, when a plurality of segments are configured in the intra-organization network 20, the network disconnecting apparatus 16 can be provided on a segment basis. For example, the network disconnecting apparatus 16 can be configured to disconnect access from the device 12 to the intra-organization network 20. Further, for example, the network disconnecting apparatus 16 can be configured to disconnect access from the device 12 to an external network of the organization 1, such as the Internet 22, while permitting access from the device 12 to the intra-organization network 20.

The firewall/proxy server 18 is a network device having a firewall function and a proxy function. The firewall function controls access from an external network to the intra-organization network 20 via the Internet 22 and access from the intra-organization network 20 to the external network via the Internet 22. The proxy function relays connection between the intra-organization network 20 and the Internet 22.

The intra-organization network 20 is an intranet constructed by a dedicated line or a virtual dedicated line, for example. The intra-organization network 20 may include a plurality of segments constructed for respective bases of the organization 1, for example.

The information delivery server 24 is a server that regularly or irregularly delivers vulnerability information related to software executed in the device 12 to the management apparatus 10 via the Internet 22. The software for which vulnerability information is delivered includes, for example, operating system (OS), middleware, application software, or the like. The vulnerability information includes, for example, a content of vulnerability, the degree of influence of vulnerability, an investigation method for vulnerability, a countermeasure method against vulnerability, or the like. For example, the information delivery server 24 collects vulnerability information disclosed by an OS bender or a software bender or vulnerability information issued from an organization that issues vulnerability information. The information delivery server 24 delivers, to the management apparatus 10, vulnerability information required for the system 2 in the organization 1 out of the collected vulnerability information. Note that it is also possible to manually input vulnerability information to the management apparatus 10.

Figure 2:
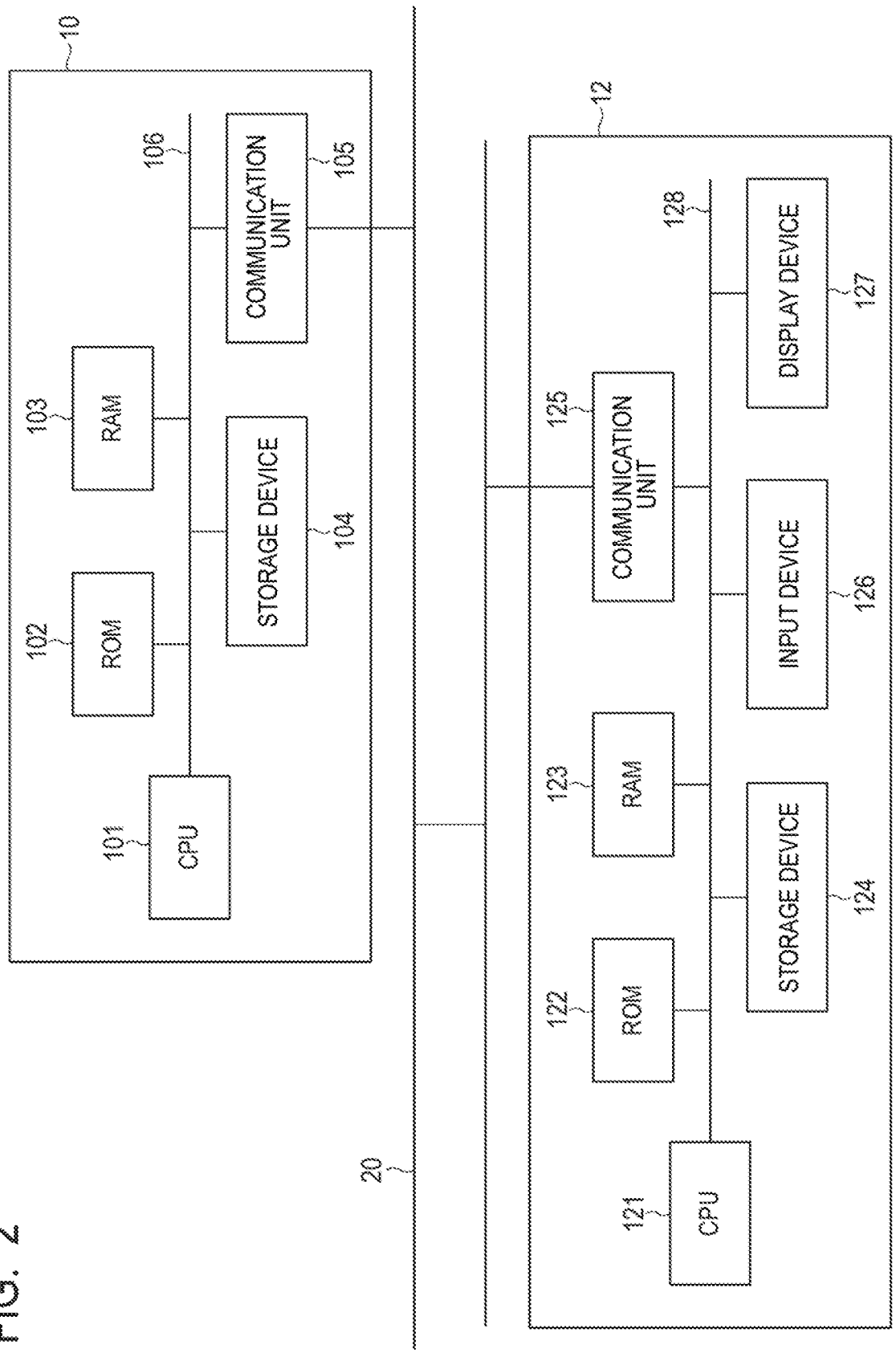
FIG. 2 is a block diagram illustrating an example of a hardware configuration of the management apparatus and the devices to be managed thereby according to the first example embodiment of the present invention.

In such a way, the system 2 including the management apparatus 10 and the plurality of devices 12 to be managed thereby is constructed in the organization 1. The management apparatus 10 and the device 12 will be further described below with reference to FIG. 2. FIG. 2 is a block diagram illustrating an example of a hardware configuration of the management apparatus 10 and the device 12 to be managed thereby according to the present example embodiment.

As illustrated in FIG. 2, the management apparatus 10 has a central processing unit (CPU) 101, a read only memory (ROM) 102, a random access memory (RAM) 103, a storage device 104, and a communication unit 105. The CPU 101, the ROM 102, the RAM 103, the storage device 104, and the communication unit 105 are connected to a common bus line 106.

The CPU 101 operates in accordance with a program stored in the ROM 102, the storage device 104, or the like and functions as a control unit that controls the operation of the overall management apparatus 10. The RAM 103 provides a memory region required for the operation of the CPU 101. In particular, the CPU 101 executes manager software installed in the storage device 104, for example, and thereby performs the process below.

The CPU 101 receives vulnerability information delivered from the information delivery server 24 via the communication unit 105. The CPU 101 stores and accumulates the received vulnerability information in a database of the storage device 104.

Further, the CPU 101 receives, via the communication unit 105, configuration information on the device 12 transmitted from the device 12 in the system 2. The CPU 101 stores and accumulates the received configuration information in a database of the storage device 104. The configuration information on the device 12 is stored in the database for configuration information in association with identification information on the device 12.

Further, the CPU 101 transmits an instruction of vulnerability investigation to the device 12 via the communication unit 105. Based on the vulnerability information and configuration information stored in the database of the storage device 104, the CPU 101 can determine a content of vulnerability investigation to be instructed. The instruction of vulnerability investigation includes a method of finding vulnerability including a retrieval style or the like used for finding vulnerability. Note that, when vulnerability is apparent from configuration information or the like, an instruction of vulnerability investigation, implementation of the vulnerability investigation in response thereto, and transmission and aggregation of the result thereof may be omitted.

Further, the CPU 101 receives, via the communication unit 105, a result of vulnerability investigation transmitted from the plurality of devices 12 on which vulnerability investigation has been performed. The CPU 101 stores the received result of vulnerability investigation in a database of the storage device 104. In the database for the result of vulnerability investigation, the result of vulnerability investigation related to the device 12 is stored in association with identification information on the device 12.

Further, the CPU 101 can aggregate a result of vulnerability investigation stored in the database. The administrator A may check a result of vulnerability investigation aggregated by the CPU 101 on the management terminal 14.

Further, the CPU 101 transmits a countermeasure instruction against vulnerability to the device 12 via the communication unit 105. More specifically, the CPU 101 transmits a change instruction indicating a change of the software configuration in the device 12 as a countermeasure instruction against vulnerability. For example, the countermeasure against vulnerability is designed by the administrator A who has analyzed an investigation result of vulnerability investigation. Further, for example, the countermeasure against vulnerability may be automatically generated by the CPU 101 in accordance with a predefined countermeasure rule based on an investigation result of vulnerability investigation. The countermeasure instruction may be an instruction in which a change term that is a deadline by which the countermeasure should be implemented to change a software configuration is set. Further, the CPU 101 transmits a countermeasure instruction against vulnerability, as described above, and stores the countermeasure instruction in a database of the storage device 104. Note that the CPU 101 can also transmit a countermeasure instruction targeted to the device 12 to other terminals than the device 12. For example, when the device 12 is a server, the CPU 101 can transmit a countermeasure instruction to a terminal used by the administrator of the device 12, which is the server.

The change of the software configuration of the device 12 is not particularly limited and may be, for example, application of a patch to software, updating or upgrading of software, installation or uninstallation of software. Further, the change of the software configuration of the device 12 may be, for example, execution or stop of a service, change of setting of software, creation or deletion of a file, or the like. Note that the software as used herein includes OS, middleware, application software, and any other software.

Further, the CPU 101 functions as an acceptance unit and receives and accepts, via the communication unit 105, an exception application transmitted from the device 12 that has received a countermeasure instruction against vulnerability. The exception application is an application intended not to change the software configuration instructed in a countermeasure instruction against vulnerability. The CPU 101 stores the received exception application in a database of the storage device 104.

Further, the CPU 101 function as a processing unit and, based on a feature of an exception application stored in a database of the storage device 104, verifies or denies the exception application as described later. Furthermore, the CPU 101 functions as a processing unit and performs a corresponding process when denying the exception application as described later. The corresponding process may be, for example, notification to the user U and/or the administrator A or disconnection of the device 12 from a network.

In the storage device 104, software such as OS, middleware, application software, or the like executed by the CPU 101 in the management apparatus 10 is installed, for example. The application software includes various application software in accordance with a function to be implemented in the management apparatus 10 in addition to the manager software described above.

Further, the storage device 104 stores respective databases that store the vulnerability information, the configuration information, the result of vulnerability investigation, and the exception application described above.

The communication unit 105 is connected to the intra-organization network 20 and transmits and receives information via the intra-organization network 20 under the control of the CPU 101.

On the other hand, as illustrated in FIG. 2, the device 12 has a CPU 121, a ROM 122, a RAM 123, a storage device 124, a communication unit 125, an input device 126, and a display device 127. The CPU 121, the ROM 122, the RAM 123, the storage device 124, the communication unit 125, the input device 126, and the display device 127 are connected to a common bus line 128.

The CPU 121 operates in accordance with a program stored in the ROM 122, the storage device 124, or the like and functions as a control unit that controls the operation of the overall device 12. The RAM 123 provides a memory region required for the operation of the CPU 121. In particular, the CPU 121 executes agent software installed in the storage device 124, for example, and thereby performs the process below.

The CPU 121 regularly or irregularly collects configuration information on the device 12. The configuration information includes a type of OS, a version of OS, a CPU name, an Internet Protocol (IP) address, a Media Access Control (MAC) address, the activation status of a service, or information about installed software, for example. Further, the configuration information may include information about hardware of the device 12 other than the CPU name. Further, the CPU 121 transmits the collected configuration information to the management apparatus 10 via the communication unit 125 regularly or irregularly. At this time, the CPU 121 transmits the configuration information in association with identification information such as identification (ID) that identifies the device 12 or a device name, or the like.

The CPU 121 receives, via the communication unit 125, an instruction of vulnerability investigation transmitted from the management apparatus 10. Further, the CPU 121 performs vulnerability investigation of the device 12 by using a method of finding vulnerability included in an instruction of vulnerability investigation and investigates whether or not there is vulnerability in the device 12.

In vulnerability investigation, the CPU 121 performs the next check process in accordance with a method of finding vulnerability. For example, the CPU 121 checks a file, a holder, or a registry. Further, the CPU 121 checks the version of software, for example. Further, the CPU 121 checks an execution result of a command, for example. Further, the CPU 121 checks the activation status of a service or a process, for example. Further, the CPU 121 checks a response to a particular input, for example. Further, the CPU 121 acquires and checks system information in the device 12, for example. The CPU 121 performs these check processes and thereby can investigate whether or not there is vulnerability in the device 12.

Further, the CPU 121 transmits a result of vulnerability investigation performed as described above to the management apparatus 10 via the communication unit 125. At this time, the CPU 121 transmits the result of vulnerability investigation in association with identification information such as ID that specifies the device 12, a device name, or the like.

Further, the CPU 121 receives, via the communication unit 125, a countermeasure instruction against vulnerability transmitted from the management apparatus 10. Further, the CPU 121 displays a notification window indicating the content of a countermeasure included in the received countermeasure instruction on the display device 127. Accordingly, the CPU 121 notifies the user U of the device 12 of a countermeasure instruction received from the management apparatus 10 and urges the user U to take the countermeasure in accordance with the instruction.

Note that the countermeasure instruction received from the management apparatus 10 may be a mandatory instruction of a countermeasure that can be automatically implemented. In such a case, the CPU 121 automatically implements the countermeasure against vulnerability in accordance with the mandatory instruction of the countermeasure received from the management apparatus 10. In the following, unless otherwise explicitly specified, a case where a countermeasure instruction received from the management apparatus 10 is a countermeasure instruction that requests the user U to manually implement a countermeasure will be described.

Further, when a countermeasure against vulnerability is implemented, the CPU 121 changes the software configuration as described above as a countermeasure against vulnerability in accordance with an instruction from the user U input via the input device 126. The user U may change the software configuration of the device 12 via the input device 126 in accordance with the content of the countermeasure displayed on the display device 127.

On the other hand, when not implementing the countermeasure against vulnerability, the CPU 121 transmits an exception application to the management apparatus 10 via the communication unit 125. The exception application is an application intended not to change a software configuration instructed in the countermeasure instruction against vulnerability, exceptionally, as described above. The CPU 121 can transmit an exception application in accordance with an instruction of the user U input via the input device 126.

Further, the CPU 121 receives, via the communication unit 125, a notification transmitted from the management apparatus 10. The CPU 121 can display the content of the received notification on the display device 127 with a pop-up view or the like.

In the storage device 124, software such as OS, middleware, application software, or the like executed by the CPU 121 in the device 12 is installed, for example. The application software includes various application software in accordance with a function to be implemented in the device 12 in addition to the agent software described above.

Further, the storage device 124 stores various data such as data created by the device 12, data required for a process in the device 12, or the like.

The communication unit 125 is connected to the intra-organization network 20 and transmits and receives information via the intra-organization network 20 under the control of the CPU 121.

The input device 126 is used for inputting information, an instruction, or the like to the device 12. The input device 126 is not particularly limited and may be a keyboard, a pointing device, or the like. Further, the input device 126 may be a touch panel embedded in the display device 127.

The display device 127 is used for displaying the output from the device 12. The display device 127 is not particularly limited and may be, for example, a liquid crystal display, an organic electroluminescence (EL) display, or the like.

Figure 3:
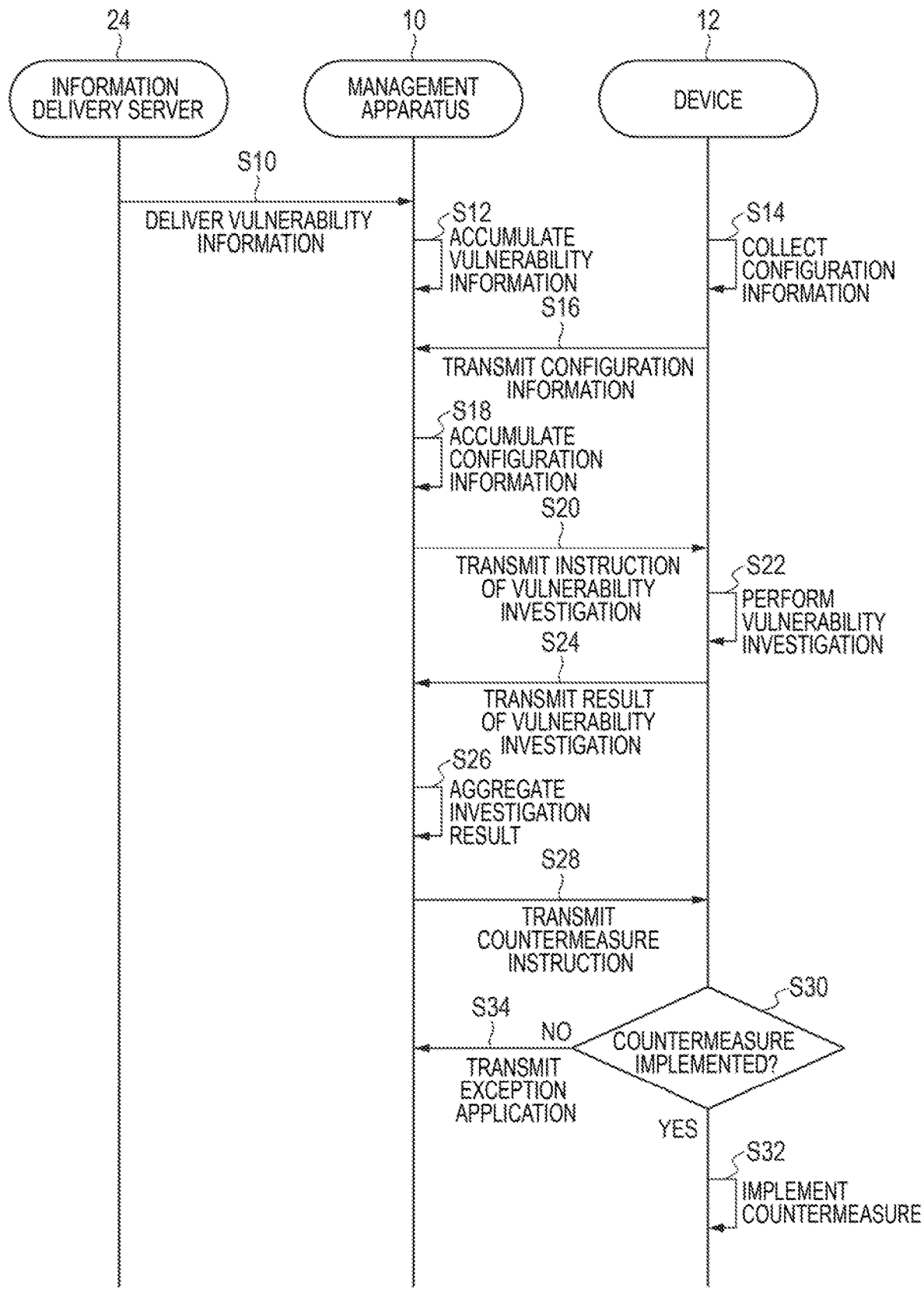
FIG. 3 is a sequence diagram illustrating the process of the management apparatus, the device, and an information delivery server according to the first example embodiment of the present invention.
Figure 4A:
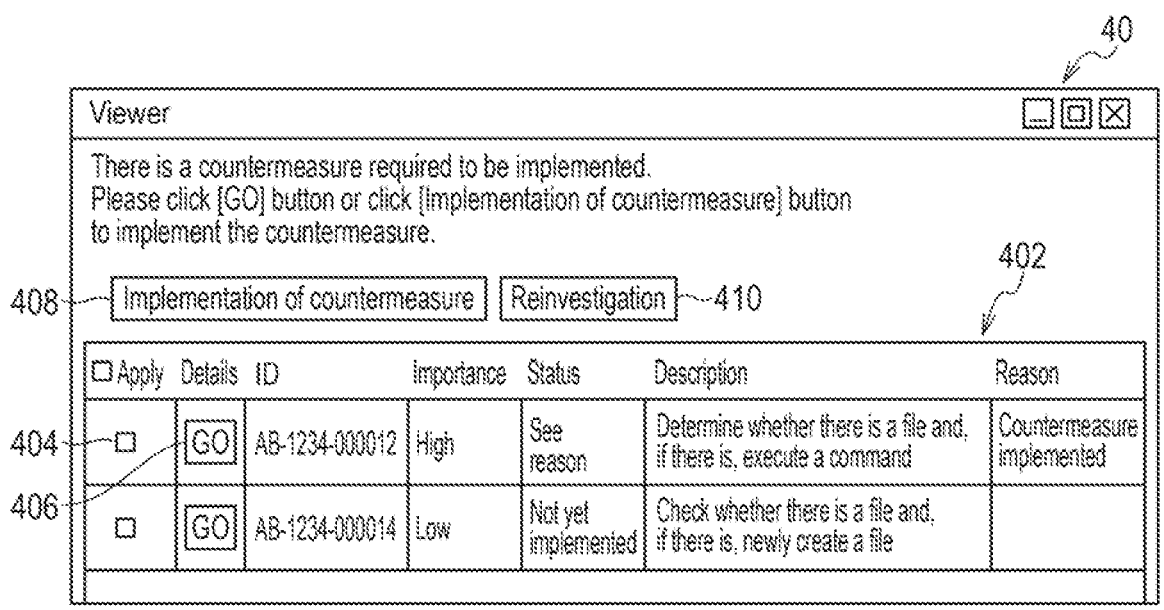
FIG. 4A is a schematic diagram illustrating an example of a display window in a device targeted by a countermeasure instruction from the management apparatus according to the first example embodiment of the present invention.
Figure 5:
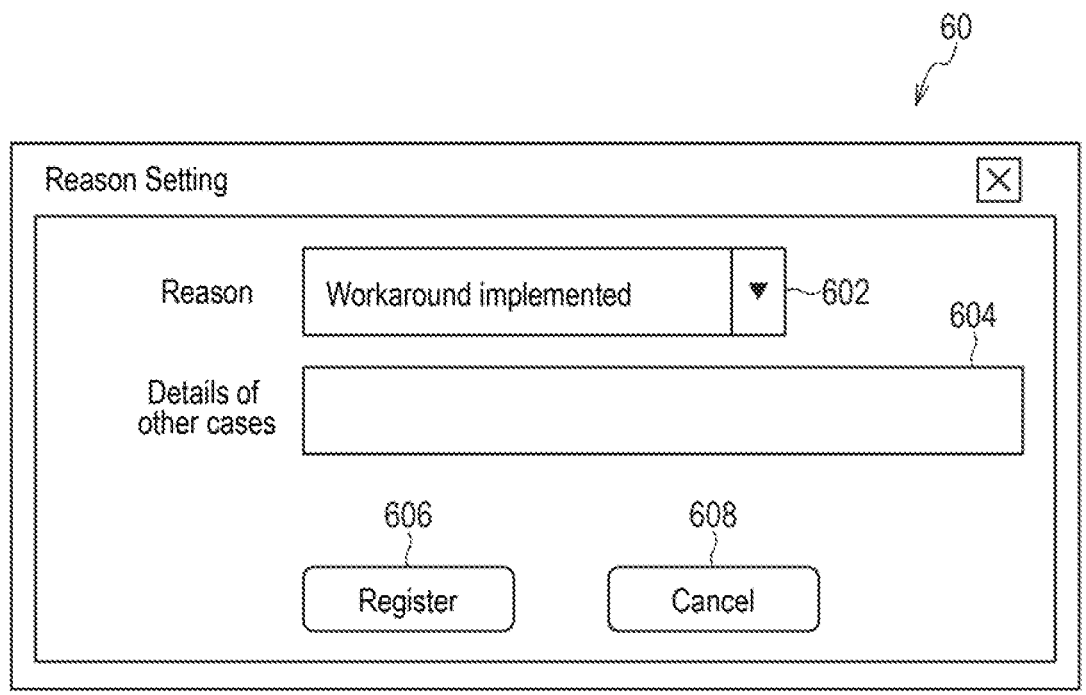
FIG. 5 is a schematic diagram illustrating an example of an application window of an exception application to the management apparatus according to the first example embodiment of the present invention.
Figure 6:
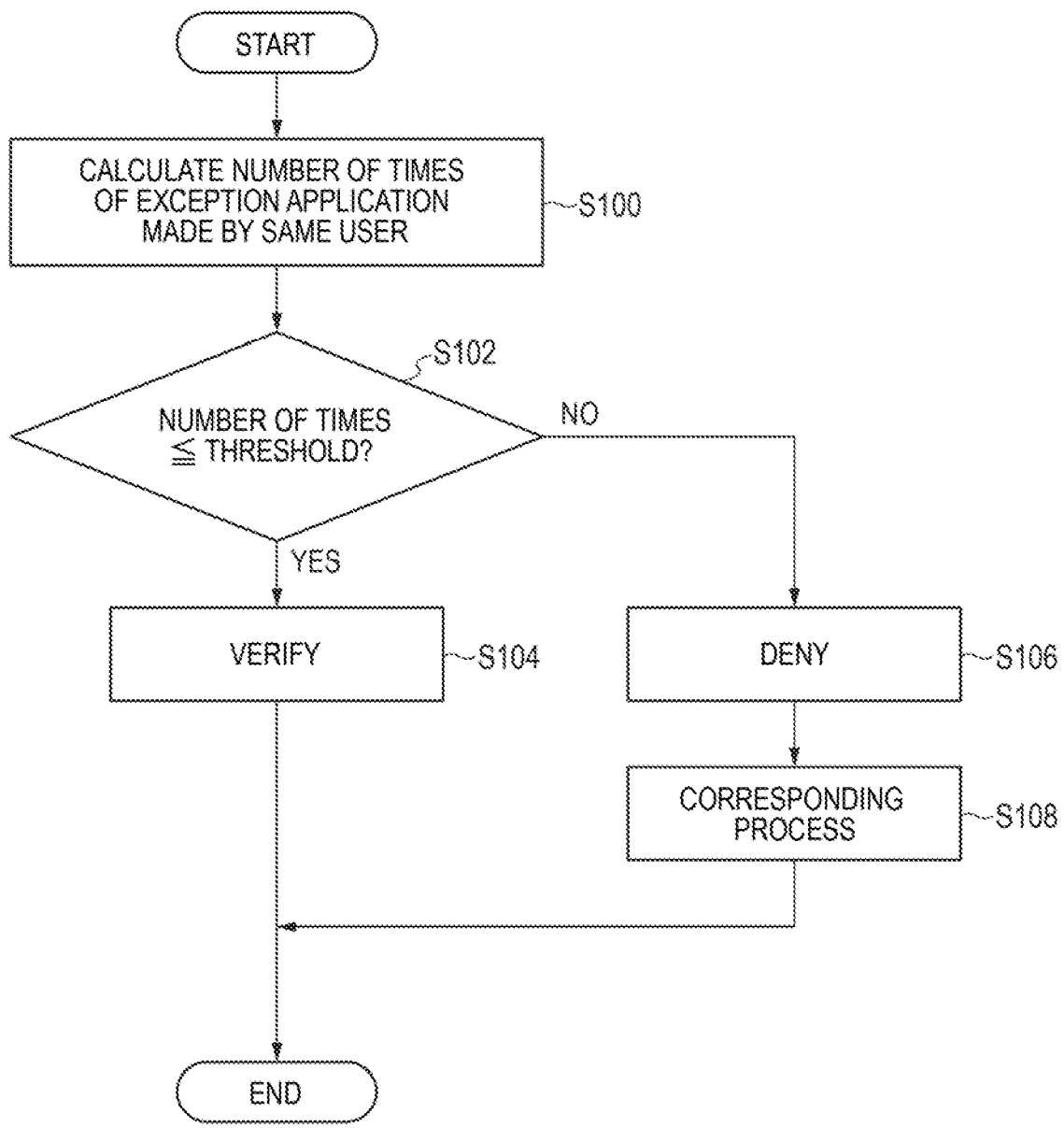
FIG. 6 is a flowchart illustrating a management method performed by the management apparatus according to the first example embodiment of the present invention.

Next, a management method performed by the management apparatus 10 according to the present example embodiment will be further described with reference to FIG. 3 to FIG. 6. FIG. 3 is a sequence diagram illustrating the process of the management apparatus 10, the device 12, and an information delivery server 24 according to the present example embodiment. FIGS. 4A and 4B are schematic diagrams each illustrating an example of a notification window of a countermeasure instruction from the management apparatus 10 according to the present example embodiment. FIG. 5 is a schematic diagram illustrating an example of an application window of an exception application to the management apparatus 10 according to the present example embodiment. FIG. 6 is a flowchart illustrating the management method performed by the management apparatus 10 according to the present example embodiment.

As illustrated in FIG. 3, the information delivery server 24 delivers vulnerability information to the management apparatus 10 regularly or irregularly via the Internet 22 (step S10).

At the management apparatus 10 included in the system 2, the CPU 101 stores and accumulates the vulnerability information delivered from the information delivery server 24 as a database (step S12). In such a way, vulnerability information about vulnerability that may be a threat to the system 2 is managed in a centralized manner in the management apparatus 10.

Further, at each device 12 included in the system 2, the CPU 121 regularly or irregularly collects configuration information on the device 12 (step S14). Subsequently, the CPU 121 transmits the collected configuration information to the management apparatus 10 (step S16).

At the management apparatus 10, the CPU 101 stores and accumulates the configuration information transmitted from the device 12 in a database (step S18).

Further, at the management apparatus 10, the CPU 101 transmits an instruction of vulnerability investigation to the device 12 (step S20). The CPU 101 can determine the content of vulnerability investigation based on the vulnerability information and the configuration information.

At each device 12, the CPU 121 performs vulnerability investigation in response to the instruction of vulnerability investigation transmitted from the management apparatus 10 (step S22). Further, at each device 12, the CPU 121 transmits a result of the performed vulnerability investigation to the management apparatus 10 (step S24).

In the management apparatus 10, the CPU 101 aggregates the result of vulnerability investigation transmitted from each device 12 (step S26).

Next, at the management apparatus 10, the CPU 101 transmits a countermeasure investigation against vulnerability to the device 12 (step S28).

The countermeasure instruction against vulnerability transmitted to the device 12 can be displayed on the display device 127 at the device 12. FIGS. 4A and 4B are schematic diagrams each illustrating an example of a display window at the device 12 for the countermeasure instruction from the management apparatus 10. FIG. 4A illustrates an example of a viewer window in which countermeasure instructions are displayed in a list form. FIG. 4B illustrates an example of a detail window indicating details of a countermeasure.

At the device 12, in response to receiving a countermeasure instruction against vulnerability from the management apparatus 10, the CPU 121 can cause the display device 127 to display a viewer window 40 illustrated in FIG. 4A in a pop-up view to urge the user U to implement the countermeasure, for example. Further, once a [GO] button 406 in the viewer window 40 is clicked, the CPU 121 can cause the display device 127 to display a detail window 50 illustrated in FIG. 4B. Furthermore, once a [Reason setting] button 510c in the detail window 50 is clicked, the CPU 121 can cause the display device 127 to display a reason setting window 60 illustrated in FIG. 5.

In the viewer window 40, a countermeasure instruction list field 402 in which countermeasures against vulnerability are displayed in a list form is provided. In the countermeasure instruction list field 402, "ID" that is an identifier identifying a countermeasure, "Importance" indicating the level of importance of a countermeasure, "Status" indicating whether or not a countermeasure is implemented, "Description" describing a countermeasure content, and "Reason" indicating a reason for an exception application are displayed for each countermeasure.

Further, a checkbox 404 used for selecting a countermeasure and the [GO] button 406 used for displaying a detail window indicating details of a countermeasure are provided for each countermeasure displayed in the countermeasure instruction list field 402. By clicking the [GO] button 406, it is possible to display the detail window 50 illustrated in FIG. 4B that displays the details of the countermeasure.

Further, in the viewer window 40, a [Implementation of countermeasure] button 408 used for instruction of implementation of a measurement is provided. When the countermeasure can be automatically implemented, by checking the checkbox 404 for the countermeasure and clicking the [Implementation of countermeasure] button 408, it is possible to implement the countermeasure. In addition, in the viewer window 40, a [Reinvestigation] button 410 used for an instruction of reimplementation of vulnerability investigation or the like are provided.

In the detail window 50, a risk display field 502 is provided. The risk display field 502 displays information about a risk due to vulnerability targeted by a countermeasure. In the risk display field 502, "Risk ID" that is an identifier identifying a risk, "Title" indicating a countermeasure, "Summary" indicating the summary of vulnerability, "Target product" indicating a product targeted by a countermeasure, and "Details" indicating details of a risk due to vulnerability are displayed.

Further, in the detail window 50, a countermeasure selection field 504 that selects a countermeasure is provided. In the countermeasure selection field 504, one or a plurality of countermeasures when one or more countermeasures are implemented and an exception application when no countermeasure is implemented can be selected by using a pulldown menu, for example.

Further, in the detail window 50, the countermeasure detail field 506 indicating details of a countermeasure selected in the countermeasure selection field 504 is provided. In the countermeasure detail field 506, "Countermeasure content description" describing the content of a countermeasure, "Influence point when countermeasure is implemented" indicating an influence point caused by implementation of a countermeasure, and "Related information" indicating related information are displayed.

Further, in the detail window 50, a button display region 508 in which a displayed button is switched in accordance with a selected content in the countermeasure selection field 504 is provided. When the selected countermeasure is a countermeasure that can be automatically implemented, an [Implement countermeasure] button 510a is displayed in the button display region 508. When the [Implement countermeasure] button 510a is clicked, the countermeasure is automatically implemented in the device 12. Further, when the selected countermeasure is a countermeasure that is required to be manually implemented, a [Confirm countermeasure status] button 510b is displayed in the button display region 508. After the user U manually implements the countermeasure, it is possible to check the implementation status of the countermeasure by clicking the [Check countermeasure status] button 510b. On the other hand, when the exception application is selected, a [Reason setting] button 510c is displayed. When the [Reason setting] button 510c is clicked, the reason setting window 60 illustrated in FIG. 5 used for setting a reason for the exception application is displayed on the display device 127.

Note that the management apparatus 10 can also transmit a countermeasure instruction against vulnerability by using an electronic mail addressed to the user U of the device 12. Note that each window illustrated in FIGS. 4A and 4B and FIG. 5 described above is an example, some of the contents may be omitted, and the window layout or window transition is not limited thereto. Further, a countermeasure instruction against vulnerability can also be transmitted to the user U through a user interface implemented on a web or the like in addition to agent software or a mail.

The user U who has received a countermeasure instruction against vulnerability in a manner described above determines whether or not to implement the countermeasure for the device 12 in use or management (step S30). If the user determines to implement the countermeasure (step S30, YES), the user U implements the countermeasure in accordance with the countermeasure instruction (step S32).

On the other hand, it the user U determines not to implement the countermeasure (step S30, NO), the user U makes an exception application from the device 12 to the management apparatus 10. In such a case, the user U selects an exception application in the countermeasure selection field 504 of the detail window 50 illustrated in FIG. 4B and clicks the [Reason setting] button 510*c* displayed in the button display region 508. Thereby, the reason setting window 60 is displayed on the display device 127.

In the reason setting window 60, a reason selection field 602 is provided. In the reason selection field 602, a pulldown menu may be used to select a reason for the exception application from options such as "Countermeasure has already been implemented", "Because of development environment", "Insufficient specification of the device", "Others", or the like that are fixed reasons, for example. Further, in the reason setting window 60, a reason entry field 604 is provided in which a reason can be input in a form of a free text when "Others" is selected in the reason selection field 602. The user U may set a reason for the exception application in the reason selection field 602 or the reason entry field 604.

Further, in the reason setting window 60, a [Register] button 606 and a [Cancel] button 608 are provided. The [Register] button 606 is a button used for registering a reason for the exception application set in the reason selection field 602 or the reason entry field 604 in the management apparatus 10. The [Cancel] button 608 is a button used for cancelling the setting of a reason for the exception application.

At the device 12, in response to the [Register] button 606 being clicked by the user U, the CPU 121 transmits the exception application to the management apparatus 10 together with the set reason (step S34).

In such a way, the user U may perform the exception application on the countermeasure instruction transmitted from the management apparatus 10. The exception application can include date and time when the exception application is performed, identification information on the user U who is the applicant, identification information on the device 12 targeted by the exception application, identification information on a countermeasure targeted by the exception application, or the like, for example. The identification information on the user U may be, for example, the name, ID, an electronic mail address, or the like of the user U. The identification information on the device 12 may be, for example, the device name, ID, an IP address, or the like of the device 12. The identification information on the countermeasure may be, for example, the name, ID, or the like of the countermeasure.

In such a way, in the system 2 including the management apparatus 10 and the device 12, when a countermeasure against vulnerability for a certain device 12 is not implemented for some reason, an exception application can be made to the management apparatus 10. For example, in accordance with the device 12 that the user U uses or manages by himself/herself, the user U may make an exception application intended not to implement a change of the software configuration as a countermeasure against vulnerability for a reason that the device 12 is for providing a development environment, that the specification of the device 12 is insufficient, or the like. The user U may make an exception application to one or a plurality of devices 12.

However, some user U may repeatedly make an exception application for the purpose of neglecting the change operation despite the fact that the user U may be able to perform a change of the software configuration of the device 12 instructed as a countermeasure against vulnerability. There is a case where there is no valid reason for the user U not performing a change operation, for example, when the user U does not know how to change the software configuration and thus is unable to perform a change operation, when the user U is unable to take time for a change operation due to convenience of work or the like, or the like. In such a case, the user U may neglect the change operation and make an exception application for the purpose of avoiding notification from the administrator A, disconnection of the device 12 from the network, or the like due to negligence of the change operation.

In particular, when the number of times of exception applications made by the same user U is excessively large, the exception applications made by the user U can be evaluated as unreliable exception applications intended to neglect the change operation of the software configuration as described above. Therefore, such exception applications can be denied.

Accordingly, the management apparatus 10 according to the present example embodiment verifies or denies the exception application for each user U who is an applicant of the exception application based on the number of times of exception applications that is one of the features of exception applications, more specifically, based on the number of times of exception applications made by the same user U.

The process related to an exception application in the management method performed by the management apparatus 10 according to the present example embodiment will be described below with reference to FIG. 6.

Note that the timing when the management apparatus 10 performs the process related to an exception application is not particularly limited. The management apparatus 10 can perform the process related to an exception process on a certain period basis such as on a weekly basis, on a monthly basis, on a quarterly basis, on a half yearly basis, on a yearly basis, or the like, for example. Further, the management apparatus 10 can also perform the process related to the exception application every time receiving an exception application from the user U, for example.

As illustrated in FIG. 6, first, at the management apparatus 10, the CPU 101 references a database for exception applications stored in the storage device 104 and calculates the number of times of exception applications made by the same user U (step S100). In the calculation of the number of times of exception applications, the CPU 101 can calculate the number of times of exception applications made in a certain period, such as on a weekly basis, on a monthly basis, on a quarterly basis, on a half yearly basis, on a yearly basis, or the like, for example.

Next, the CPU 101 compares the number of times of exception applications calculated in step S100 with a threshold and determines whether or not the number of times of exception applications is less than or equal to the threshold (step S102). The threshold as used herein is the upper limit number of times a single user U may make exception applications in a certain period and is a value suitably set in the organization 1. Further, the upper limit number of times that is the threshold may be set to an individual value for each user U in accordance with the authority or the like of the user U or may be set to the same value equally for a plurality of users U. Further, the upper limit number of times can be stored in advance in a database pre-stored in the storage device 104 or the like so that the CPU 101 can make a reference.

If the CPU 101 determines that the number of times of exception applications is less than or equal to the threshold (step S102, YES), the CPU 101 verifies the exception application made in the certain period by the same user U (step S104). When the number of times of exception applications made by the same user U is relatively small in such a way, it can be evaluated that the exception application(s) is reliable, and thus the exception application can be verified.

On the other hand, if the CPU 101 determines that the number of times of exception applications exceeds the threshold (step S102, NO), the CPU 101 denies the exception applications made in the certain period by the same user U (step S106). When the number of times of exception applications made by the same user U is relatively large in such a way, it can be evaluated that the exception applications are unreliable, and thus the exception application can be denied.

In response to denying the exception application, the CPU 101 performs a corresponding process related to the denial of the exception application (step S108). The CPU 101 can perform notification to the user U who made the denied exception application or notification to the user U or the administrator A of the device 12 targeted by the denied exception application, for example, as the corresponding process. Further, the CPU 101 can disconnect the device 12 targeted by the denied exception application from a network, for example, as the corresponding process. The CPU 101 can perform any one of the notification to the user U, the notification to the administrator A, and the disconnection of the device 12 from the network or can perform any two or all of the above in combination.

The notification includes a content for transferring to the user U and/or the administrator A that the exception application was denied, for example. Further, the notification may include a content for urging the user U and/or the administrator A to implement a countermeasure against vulnerability targeted by the denied exception application, for example. Further, the notification may include a content for warning that a penalty such as a restriction on a use of the device 12 in the organization 1 will be imposed if the countermeasure against vulnerability has not yet been taken, for example.

The CPU 101 can transmit the notification described above to the device 12 used by the user U who made the denied exception application, the device 12 targeted by the denied exception application, or the management terminal 14 used by the administrator A via the intra-organization network 20. The device 12 or the management terminal 14 that has received the notification can display the content of the notification with a pop-up view or the like. Further, the CPU 101 can perform the notification by transmitting an electronic mail including the content of the above notification to an electronic mail address of the user U who made the denied exception application and/or the administrator A.

Further, when disconnecting the device 12 targeted by the denied exception application from a network, the CPU 101 transmits an instruction of network disconnection associated with the device 12 to the network disconnecting apparatus 16 via the intra-organization network 20. In response to receiving the instruction of network disconnection, the network disconnecting apparatus 16 disconnects access from the device 12 in accordance with the instruction to the intra-organization network 20 or the Internet 22.

As described above, according to the present example embodiment, since an exception application is verified or denied for each user U who is an applicant based on the number of times of exception applications made by the same user U, the exception application made by the user U can be appropriately verified or denied. Further, according to the present example embodiment, since the exception application can be appropriately verified or denied, exception applications intended to neglect a change operation of the software configuration can be suppressed.

Second Example Embodiment

A management apparatus and a management method according to a second example embodiment of the present invention will be described with reference to FIG. 7. Note that the same components as those in the first example embodiment described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

Also when the number of devices 12 on which exception applications have been made by the same user U is excessively large, it can be evaluated that the exception applications made by the user U are unreliable exception applications intended to neglect a change operation of the software configuration as described above. Therefore, such exception applications can be denied.

Accordingly, the management apparatus 10 according to the present example embodiment verifies or denies an exception application for each user U who is an applicant of the exception application based on the number of times of exception applications that is one of the features of exception applications, more specifically, based on the number of devices on which exception applications have been made by the same user U. That is, the management apparatus 10 according to the present example embodiment verifies or denies an exception application on a user U basis based on the number of times of exception applications targeted and made to a plurality of devices 12 by the same user U.

The process related to an exception application in the management method performed by the management apparatus 10 according to the present example embodiment will be described below with reference to FIG. 7. FIG. 7 is a flowchart illustrating the management method performed by the management apparatus 10 according to the present example embodiment. Note that, also in the present example embodiment, the timing when the management apparatus 10 performs the process related to an exception application is not particularly limited in the same manner as the first example embodiment.

Figure 7:
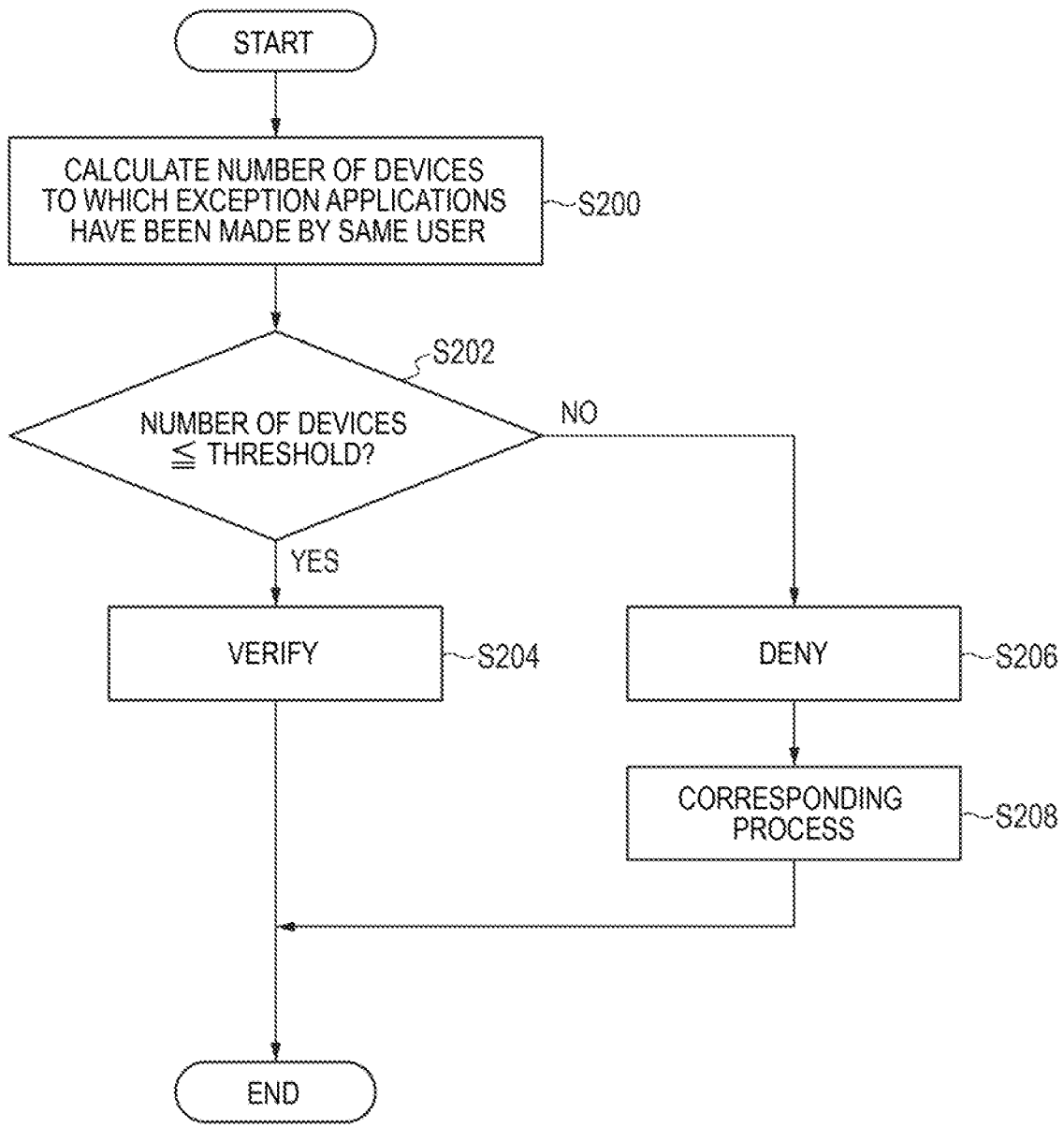
FIG. 7 is a flowchart illustrating a management method performed by a management apparatus according to a second example embodiment of the present invention.

As illustrated in FIG. 7, first, at the management apparatus 10, the CPU 101 references a database for exception applications stored in the storage device 104 and calculates the number of devices 12 on which exception applications have been made by the same user U (step S200). In the calculation of the number of devices 12, the CPU 101 can calculate the number of devices 12 on which exception applications have been made by the same user U in a certain period, such as on a weekly basis, on a monthly basis, on a quarterly basis, on a half yearly basis, on a yearly basis, or the like, for example.

The number of devices 12 to be calculated may be the total number in which a single device 12 on which multiple times of exception applications have been made is calculated as a plurality of devices 12 in accordance with the number of times of exception applications or may be the actual number in which a single device 12 on which multiple times of exception applications have been made is calculated as one device 12.

Next, the CPU 101 compares the number of devices 12 calculated in step S200 with a threshold and determines whether or not the number of devices 12 is less than or equal to the threshold (step S202). The threshold as used herein is the upper limit number of devices 12 on which a single user U may make exception applications in a certain period and is a value suitably set in the organization 1. Further, the upper limit number that is the threshold may be set to an individual value for each user U in accordance with the authority or the like of the user U or may be set to the same value equally for a plurality of users U. Further, the upper limit number can be stored in advance in a database pre-stored in the storage device 104 or the like so that the CPU 101 can make a reference.

If the CPU 101 determines that the number of devices 12 is less than or equal to the threshold (step S202, YES), the CPU 101 verifies the exception application made for one or a plurality of devices 12 in the certain period by the same user U (step S204). When the number of devices 12 on which exception applications have been made by the same user U is relatively small in such a way, it can be evaluated that the exception application(s) is reliable, and thus the exception applications can be verified.

On the other hand, if the CPU 101 determines that the number of devices 12 exceeds the threshold (step S202, NO), the CPU 101 denies the exception applications made for a plurality of devices 12 in the certain period by the same user U (step S206). When the number of devices 12 on which exception applications have been made by the same user U is relatively large in such a way, it can be evaluated that the exception applications are unreliable, and thus the exception application can be denied.

In response to denying the exception application, the CPU 101 performs a corresponding process related to the denial of the exception application (step S208). The CPU 101 can perform the same corresponding process as that in the first example embodiment.

As described above, according to the present example embodiment, since an exception application is verified or denied for each user U who is an applicant based on the number of devices 12 on which exception applications have been made by the same user U, the exception application made by the user U can be appropriately verified or denied. Further, according to the present example embodiment, since the exception application can be appropriately verified or denied, exception applications intended to neglect a change operation of the software configuration can be suppressed.

Third Example Embodiment

A management apparatus and a management method according to a third example embodiment of the present invention will be described with reference to FIG. 8. Note that the same components as those in the first and second example embodiments described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

When the number of times of exception applications targeted and made to the same device 12 is excessively large, it can be evaluated that the exception applications targeted and made to the device 12 are unreliable exception applications intended to neglect a change operation of the software configuration as described above. Therefore, such exception applications can be denied.

Accordingly, the management apparatus 10 according to the present example embodiment verifies or denies an exception application for each device 12 targeted by the exception application based on the number of times of exception applications that is one of the features of exception applications, more specifically, based on the number of times of exception applications targeted and made to the same device 12.

The process related to an exception application in the management method performed by the management apparatus 10 according to the present example embodiment will be described below with reference to FIG. 8. FIG. 8 is a flowchart illustrating the management method performed by the management apparatus 10 according to the present example embodiment. Note that, also in the present example embodiment, the timing when the management apparatus 10 performs the process related to an exception application is not particularly limited in the same manner as the first example embodiment.

Figure 8:
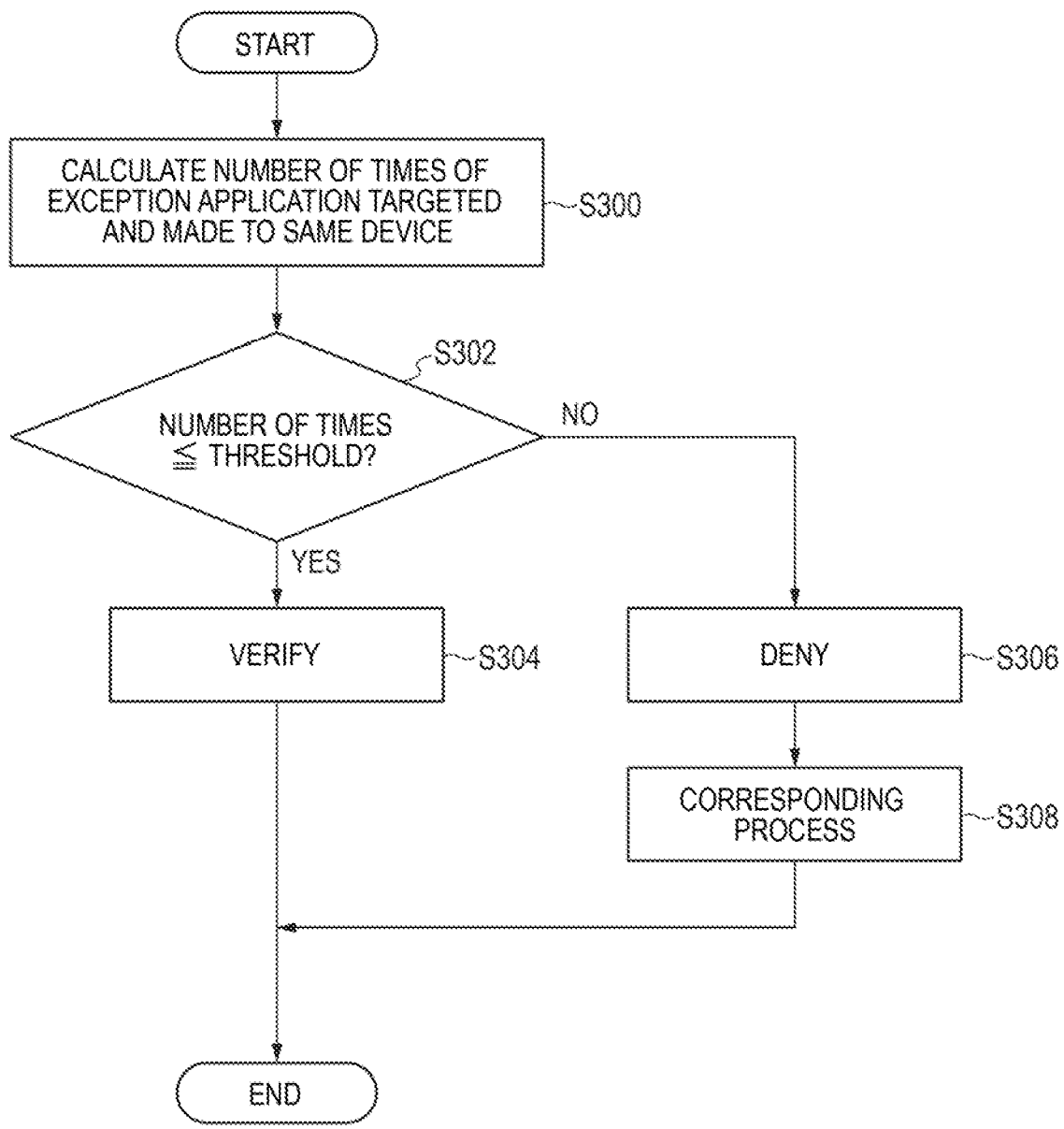
FIG. 8 is a flowchart illustrating a management method performed by a management apparatus according to a third example embodiment of the present invention.

As illustrated in FIG. 8, first, at the management apparatus 10, the CPU 101 references a database for exception applications stored in the storage device 104 and calculates the number of times of exception applications targeted and made to the same device 12 (step S300). In the calculation of the number of times of exception applications, the CPU 101 can calculate the number of times of exception applications targeted and made to the same device 12 in a certain period, such as on a weekly basis, on a monthly basis, on a quarterly basis, on a half yearly basis, on a yearly basis, or the like, for example.

A plurality of exception applications targeted and made to the same device 12 may be those made by the same user U or may be those made by a plurality of different users U.

Next, the CPU 101 compares the number of times of exception applications calculated in step S300 with a threshold and determines whether or not the number of times of exception applications is less than or equal to the threshold (step S302). The threshold as used herein is the upper limit number of times of exception applications that may be targeted and made to a single device 12 in a certain period and is a value suitably set in the organization 1. Further, the upper limit number of times that is the threshold may be set to an individual value for each device 12 in accordance with the type or the like of the device 12 or may be set to the same value equally for a plurality of devices 12. Further, the upper limit number of times can be stored in advance in a database pre-stored in the storage device 104 or the like so that the CPU 101 can make a reference.

If the CPU 101 determines that the number of times of exception applications is less than or equal to the threshold (step S302, YES), the CPU 101 verifies the exception application targeted and made to the same device 12 in the certain period (step S304). When the number of times of exception applications targeted and made to the same device 12 is relatively small in such a way, it can be evaluated that the exception application(s) is reliable, and thus the exception application can be verified.

On the other hand, if the CPU 101 determines that the number of times of exception applications exceeds the threshold (step S302, NO), the CPU 101 denies the exception application targeted and made to the same device 12 in the certain period (step S306). When the number of times of exception applications targeted and made to the same device 12 is relatively large in such a way, it can be evaluated that the exception applications are unreliable, and thus the exception application can be denied.

In response to denying the exception application, the CPU 101 performs a corresponding process related to the denial of the exception application (step S308). The CPU 101 can perform the same corresponding process as that in the first example embodiment.

As described above, according to the present example embodiment, since an exception application is verified or denied for each device 12 targeted by the exception application based on the number of times of exception applications targeted and made to the same device 12, the exception application targeted and made to the same device 12 can be appropriately verified or denied. Further, according to the present example embodiment, since the exception application can be appropriately verified or denied, exception applications intended to neglect a change operation of the software configuration can be suppressed.

Fourth Example Embodiment

A management apparatus and a management method according to a fourth example embodiment of the present invention will be described with reference to FIG. 9. Note that the same components as those in the first to third example embodiments described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

In a plurality of devices 12 whose configurations are similar to each other, the number of times of exception applications targeted to a particular device 12 may be excessively larger than the number of times of exception applications targeted to another device 12. In such a case, it can be evaluated that the exception applications targeted to the particular device 12 are unreliable exception applications intended to neglect a change operation of the software configuration as described above. Therefore, such exception applications can be denied.

Accordingly, the management apparatus 10 according to the present example embodiment verifies or denies an exception application targeted to a particular device 12 based on the number of times of exception applications that is one of the features of exception applications, more specifically, based on a difference number of times that is a difference between the numbers of times of exception applications for a particular device 12 and another device 12 whose configurations are similar to each other.

The process related to an exception application in the management method performed by the management apparatus 10 according to the present example embodiment will be described below with reference to FIG. 9. FIG. 9 is a flowchart illustrating the management method performed by the management apparatus 10 according to the present example embodiment. Note that, also in the present example embodiment, the timing when the management apparatus 10 performs the process related to an exception application is not particularly limited in the same manner as the first example embodiment. Further, in the present example embodiment, out of the plurality of devices 12, the device 12 for which an exception application is to be verified or denied is denoted as "particular device 12", and the device 12 other than "particular device 12" is denoted as "another/the other device 12".

Figure 9:
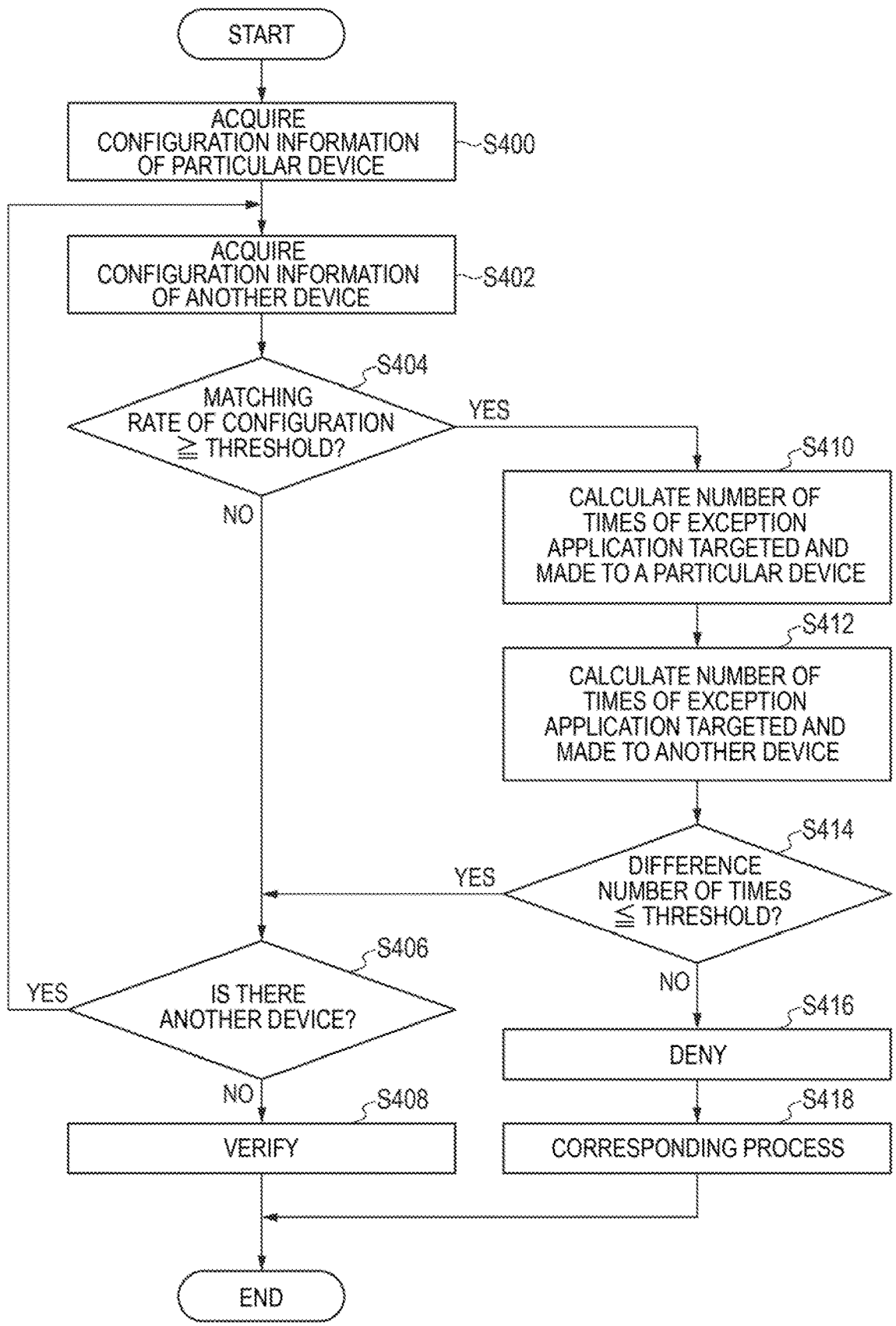
FIG. 9 is a flowchart illustrating a management method performed by a management apparatus according to a fourth example embodiment of the present invention.

As illustrated in FIG. 9, first, at the management apparatus 10, the CPU 101 references a database for configuration information of the devices 12 stored in the storage device 104 and acquires the configuration information on a particular device 12 in the whole organization 1 or a part of the organization 1 (step S400).

Next, the CPU 101 acquires the configuration information on another device 12 in the whole organization 1 or a part of the organization 1 in the same manner as in the case of the particular device 12 (step S402). Note that step S402 may be performed before step S400 or may be performed at the same time as step S400.

Next, the CPU 101 calculates a matching rate between the configuration of the particular device 12 and the other device 12 based on configuration information acquired in steps S400 and S402, respectively. Subsequently, the CPU 101 determines whether or not the calculated matching rate is greater than or equal to a threshold (step S404). The threshold as used herein is a reference used for determining the similarity between the configuration of the particular device 12 and the configuration of the other device 12 and can be suitably set, for example, preferably set to 90%, more preferably set to 95%. If it is determined that the configuration matching rate is greater than or equal to the threshold, the particular device 12 and the other device 12 are devices 12 whose configurations are similar to each other. The threshold related to the configuration matching rate can be stored in advance in a database pre-stored in the storage device 104 or the like so that the CPU 101 can made a reference.

The configuration matching rate can be calculated as a ratio of information that matches particular information included in the other configuration information out of particular information included in configuration information of one of the particular device 12 and the other device 12. For example, the configuration matching rate can be calculated as a ratio of software that matches the software installed in the other device out of the software installed in the particular device 12. Further, the configuration matching rate can be calculated as a matching ratio of information related to hardware or a matching ratio of information related to a network setting, for example. Further, the configuration matching rate can be calculated as a matching ratio of multiple pieces of information as described above.

If the CPU 101 determines that the configuration matching rate is less than the threshold (step S404, NO), the CPU 101 references the database for the configuration information on the device 12 and determines whether or not there is an additional another device 12 in the whole organization 1 or a part of the organization 1 (step S406).

If the CPU 101 determines that there is an additional another device 12 (step S406, YES), the CPU 101 moves on to the process of step S402 described above. On the other hand, if the CPU 101 determines that there is no additional another device 12 (step S406, NO), the CPU 101 moves on to the process of step S408. In particular, if the CPU 101 determines that no other device 12 whose configuration is similar to the particular device 12 is present in the whole organization 1 or a part of the organization (step S406, which is subsequent to NO at initial step S404, NO), the CPU 101 can verify the exception application (step S408).

On the other hand, if the CPU 101 determines that the configuration matching rate is greater than or equal to the threshold (step S404, YES), the CPU 101 references the database for exception applications stored in the storage device 104 and calculates the number of times of exception applications targeted and made to the particular device 12 (step S410). In the calculation of the number of times of exception application, the CPU 101 can calculate the number of times of exception applications targeted and made to the particular device 12 in a certain period, such as on a weekly basis, on a monthly basis, on a quarterly basis, on a half yearly basis, on a yearly basis, or the like, for example.

A plurality of exception applications targeted and made to the particular device 12 may be those made by the same user U or may be those made by a plurality of different users U.

Next, the CPU 101 calculates the number of times of exception applications targeted and made to another device 12 in the same manner as in the case of the particular device 12 (step S412). Note that step S412 may be performed before step S410 or may be performed at the same time as step S410.

A plurality of exception applications targeted and made to the other device 12 may be made by the same user U or may be made by a plurality of different users U.

Next, the CPU 101 calculates a difference number of times based on the numbers of times of exception applications calculated in steps S410 and S412, respectively. The difference number of times is the number of times obtained by subtracting the number of times of exception applications targeted and made to the other device 12 from the number of times of exception applications targeted and made to the particular device 12.

Subsequently, the CPU 101 determines whether or not the calculated difference number of times is less than or equal to a threshold (step S414). The threshold as used herein can be suitably set in the organization 1 and may be set to zero, for example. The threshold related to the difference number of times can be stored in advance in a database pre-stored in the storage device 104 or the like so that the CPU 101 can make a reference.

If the CPU 101 determines that the difference number of times is less than or equal to the threshold (step S414, YES), the CPU 101 moves on the process of step S406 and determines whether or not there is an additional another device 12 in the whole organization 1 or a part of the organization 1.

If the CPU 101 determines that there is no additional another device 12 other than the other device 12 for which the difference number of times is calculated in step S414 (step S406, NO), the CPU 101 verifies the exception application targeted and made to the particular device 12 (step S408). In such a case, the difference number of times for the particular device 12 is less than or equal to the threshold with respect to all the other devices 12 having similar configurations in the whole organization 1 or a part of the organization 1. Therefore, the particular device 12 has no or little difference in the number of times of exception applications compared to all the other devices having similar configurations. Accordingly, the exception application targeted and made to the particular device 12 can be evaluated to be reliable and thus can be verified.

On the other hand, if the CPU 101 determines that the difference number of times exceeds the threshold (step S414, NO), the CPU 101 denies the exception application targeted and made to the particular device 12 (step S416). In such a case, the difference number of times for the particular device 12 exceeds the threshold with respect to at least one another device 12 having the similar configuration in the whole organization 1 or a part of the organization 1. Therefore, the particular device 12 has a difference in the number of times of exception applications compared to at least one another device 12 having the similar configuration. Accordingly, the exception application targeted and made to the particular device 12 can be evaluated to be unreliable and thus can be denied.

In response to denying the exception application, the CPU 101 performs a corresponding process related to the denial of the exception application (step S418). The CPU 101 can perform the same corresponding process as that in the first example embodiment.

As described above, according to the present example embodiment, since an exception application targeted to a particular device 12 is verified or denied based on a difference number of times that is a difference between the numbers of times of exception applications for a particular device 12 and another device 12 whose configurations are similar to each other. Therefore, according to the present example embodiment, the exception application targeted and made to the particular device 12 can be appropriately verified or denied. Further, according to the present example embodiment, since the exception application can be appropriately verified or denied, exception applications intended to neglect a change operation of the software configuration can be suppressed.

Fifth Example Embodiment

A management apparatus and a management method according to a fifth example embodiment of the present invention will be described with reference to FIG. 10. Note that the same components as those in the first to fourth example embodiments described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

In two periods that are different from each other, the application rate of exception applications targeted to the same device 12 may excessively fluctuate. Note that the application rate of exception applications is a ratio of the number of times of exception applications to the number of times of instructions of a countermeasure against vulnerability in a period of interest. In such a case, exception applications made in one period with the higher application rate of exception applications can be evaluated as unreliable exception applications intended to neglect a change operation of the software configuration as described above. Therefore, such exception applications can be denied.

Accordingly, more specifically, the management apparatus 10 according to the present example embodiment verifies or denies exception applications targeted and made to the device 12 based on a difference in the application rates of exception applications targeted and made to the same device 12 in two periods different from each other. Also in the present example embodiment, the exception application is verified or denied based on the number of times of exception applications that is one of the features of exception applications.

The process related to an exception application in the management method performed by the management apparatus 10 according to the present example embodiment will be described below with reference to FIG. 10. FIG. 10 is a flowchart illustrating the management method performed by the management apparatus 10 according to the present example embodiment. Note that the management apparatus 10 according to the present example embodiment can perform a process related to exception application every time the later period of two mutually different periods elapses.

Figure 10:
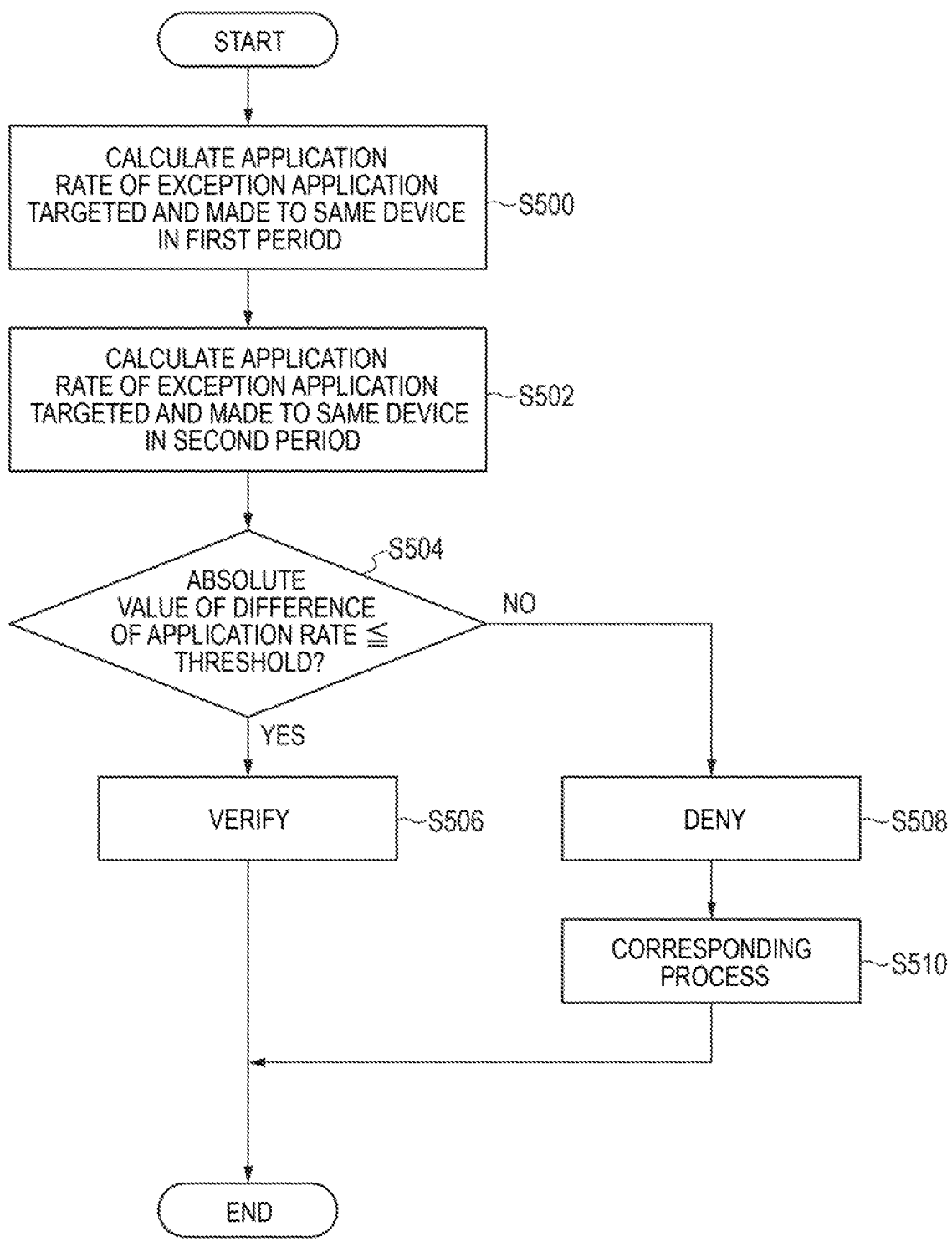
FIG. 10 is a flowchart illustrating a management method performed by a management apparatus according to a fifth example embodiment of the present invention.

As illustrated in FIG. 10, first, at the management apparatus 10, the CPU 101 references a database for exception applications stored in the storage device 104 and calculates an application rate of exception applications targeted and made to the same device 12 in a first period (step S500). The first period may be, for example, a certain period such as on a weekly basis, on a monthly basis, on a quarterly basis, on a half yearly basis, on a yearly basis, or the like.

Next, the CPU 101 calculates an application rate of exception applications targeted and made to the same device 12 in a second period that is different from the first period in the same manner as in the case of the first period (step S502). The second period may be the same length as the first period. Further, the second period may be a period earlier than the first period, for example, the former period to the first period, the same period in the previous year, the same period in the second preceding year, or the like. For example, if the first period is the second quarter, the second period may be the first quarter of the same year as the first period or the second quarter of the previous year of the first period. Note that step S502 may be performed before step S500 or may be performed at the same time as step S500.

Note that a plurality of exception applications targeted and made to the same device 12 may be those made by the same user U or may be those made by a plurality of different users U in the same manner as in the second example embodiment.

Next, the CPU 101 calculates the absolute value of the difference between the application rates of exception applications of the first period and the second period based on the application rates of exception applications calculated in steps S500 and S502. Subsequently, the CPU 101 determines whether or not the absolute value of the difference between the calculated application rates is less than or equal to a threshold (step S504). The threshold as used herein is a reference used for evaluating whether or not the application rate of exception applications has varied from the first period to the second period and can be suitably set in the organization 1, for example, may be set to 5%. The threshold related to the absolute value of the difference of application rates can be stored in advance in a database pre-stored in the storage device 104 or the like so that the CPU 101 can make a reference. Note that, instead of comparing the threshold with the absolute value of the difference between the application rates of exception applications of the first period and the second period, it is also possible to compare the suitably set threshold with the absolute value of the difference between the numbers of times of exception applications of the first period and the second period.

If the CPU 101 determines that the absolute value of the difference in application rates is less than or equal to the threshold (step S504, YES), the CPU 101 verifies the exception application targeted and made to the same device 12 in the first period and the second period (step S506). When the fluctuation in the application rate of exception applications made in periods different from each other is small in such a way, the exception applications made in both the periods can be evaluated to be reliable and thus can be verified.

On the other hand, if the CPU 101 determines that the absolute value of the difference in application rates exceeds the threshold (step S504, NO), the CPU 101 denies the exception application targeted and made to the same device 12 in the period of the higher application rate out of the first period and the second period (step S508). When the fluctuation in the application rate of exception applications made in periods different from each other is large in such a way, the exception applications made in the period of the higher application rate can be evaluated to be unreliable and thus can be denied.

In response to denying the exception application, the CPU 101 performs a corresponding process related to the denial of the exception application (step S510). The CPU 101 can perform the same corresponding process as that in the first example embodiment.

As described above, according to the present example embodiment, based on the difference between the application rates of exception applications targeted and made to the same device 12 in two periods different from each other, the exception application targeted and made to the device 12 is verified or denied. Therefore, according to the present example embodiment, the exception application targeted and made to the device 12 can be appropriately verified or denied. Further, according to the present example embodiment, since the exception application can be appropriately verified or denied, exception applications intended to neglect a change operation of the software configuration can be suppressed.

Note that the case where exception applications targeted and made to the same device 12 is verified or denied has been described above, exception applications made by the same user U can also be verified or denied based on the difference of the application rates of exception applications in the same manner as described above.

Sixth Example Embodiment

A management apparatus and a management method according to a sixth example embodiment of the present invention will be described with reference to FIG. 11. Note that the same components as those in the first to fifth example embodiments described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

As described in the first example embodiment, some user U may repeatedly make an exception application for the purpose of neglecting the change operation of the software configuration of the device 12 instructed as a countermeasure against vulnerability. In addition, in response to receiving a change instruction of the software configuration, some user U may make an exception application within a short elapsed time from the reception of the instruction without carefully considering the necessity of the change for the purpose of neglecting the change operation of the software configuration.

When an exception application is made within an excessively short elapsed time from a change instruction of the software configuration, such an exception application can be evaluated to be unreliable exception application intended to neglect the change operation of the software configuration as described above. Therefore, such an exception application can be denied.

Accordingly, the management apparatus 10 according to the present example embodiment verifies or denies an exception application based on a point of time related to a change instruction of the software configuration and a point of time when an exception application that is one of the features of exception applications was made. More specifically, the management apparatus 10 according to the present example embodiment verifies or denies an exception application based on a period between a point of time when a change instruction of the software configuration, which is one of the points of time related to a change instruction of the software configuration, was made and a point of time when an exception application was made.

The process related to an exception application in the management method performed by the management apparatus 10 according to the present example embodiment will be described below with reference to FIG. 11. FIG. 11 is a flowchart illustrating the management method performed by the management apparatus 10 according to the present example embodiment. Note that, also in the present example embodiment, the timing when the management apparatus 10 performs the process related to an exception application is not particularly limited in the same manner as the first example embodiment.

Figure 11:
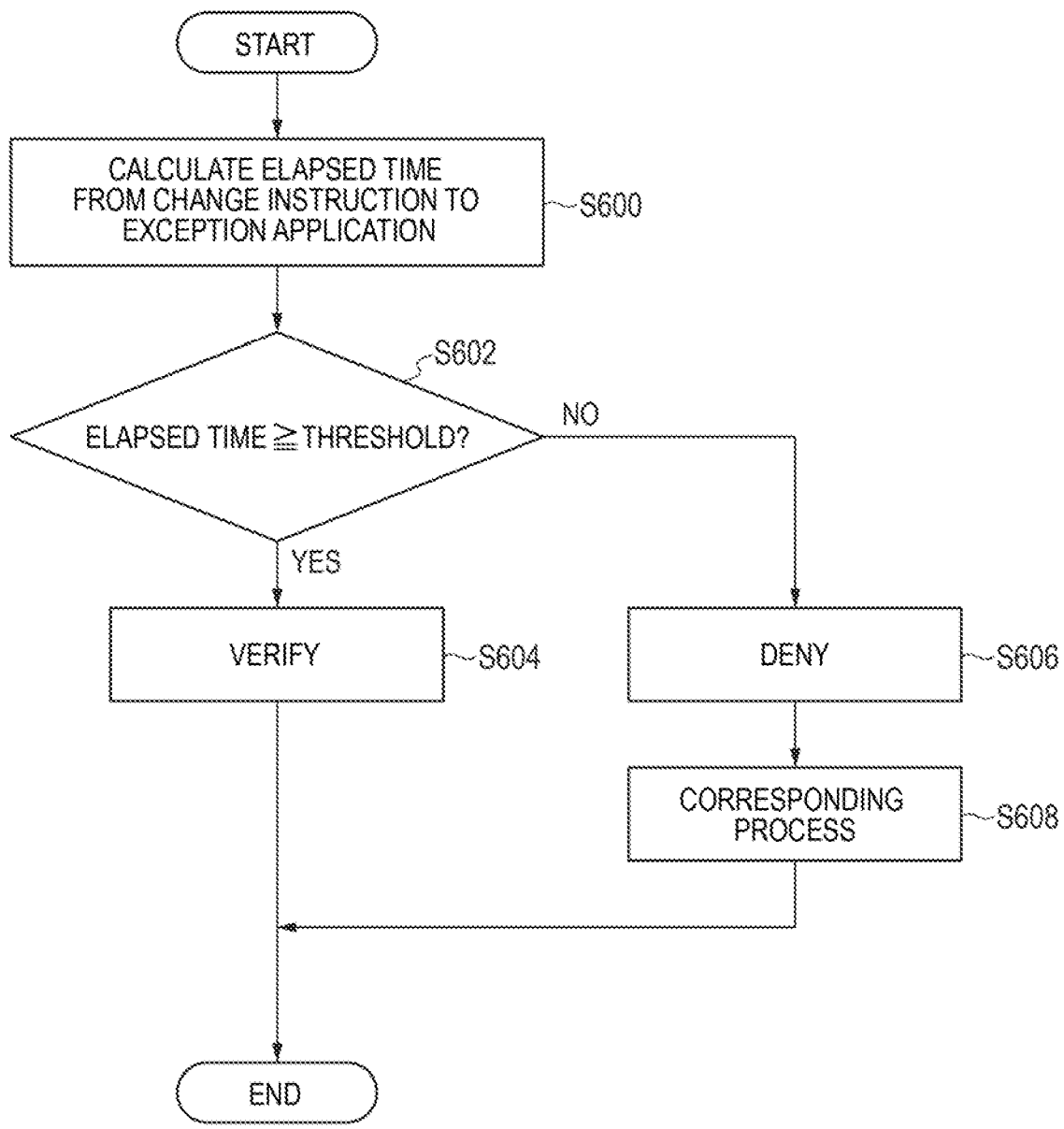
FIG. 11 is a flowchart illustrating a management method performed by a management apparatus according to a sixth example embodiment of the present invention.

As illustrated in FIG. 11, first, at the management apparatus 10, the CPU 101 references a database for countermeasure instructions against vulnerability and a database for exception applications stored in the storage device 104. Accordingly, the CPU 101 calculates a period between a point of time when a change instruction of the software configuration as a countermeasure instruction against vulnerability was provided and a point of time when an exception application was made, that is, an elapsed time from a change instruction of the software configuration to an exception application (step S600).

Note that as the elapsed time a value for a single exception application made by the same user U or a single exception application targeted and made to the same device 12 can be calculated. Further, as the elapsed time a mean value for a plurality of exception applications made by the same user U or a plurality of exception applications targeted and made to the same device 12 can be calculated. As described later in an eleventh example embodiment, when the present example embodiment is combined to any of the first to fifth example embodiments, the mean value can be used as the elapsed time.

Next, the CPU 101 compares the elapsed time calculated in step S600 with a threshold and determines whether or not the elapsed time is greater than or equal to the threshold (step S602). The threshold as used herein is a reference used for evaluating whether or not an exception application was made within an excessively short elapsed time from a change instruction of the software configuration and can be suitably set in the organization 1, for example, may be set to 10 minutes. The threshold related to the elapsed time can be stored in advance in a database pre-stored in the storage device 104 or the like so that the CPU 101 can make a reference.

If the CPU 101 determines that the elapsed time is greater than or equal to the threshold (step S602, YES), the CPU 101 verifies the exception application for which the elapsed time has been calculated (step S604). When the elapsed time from a countermeasure instruction to an exception application is sufficient in such a way, the exception application can be evaluated to be reliable and thus can be verified.

On the other hand, if the CPU 101 determines that the elapsed time is less than the threshold (step S602, NO), the CPU 101 denies the exception application for which the elapsed time has been calculated (step S606). When the elapsed time from a countermeasure instruction to an exception application is insufficient in such a way, the exception application can be evaluated to be unreliable and thus can be denied.

In response to denying the exception application, the CPU 101 performs a corresponding process related to the denial of the exception application (step S608). The CPU 101 can perform the same corresponding process as that in the first example embodiment.

As described above, according to the present example embodiment, since the exception application is verified or denied based on a period between a point of time when a change instruction of the software configuration was made and a point of time when an exception application was made, the exception application can be appropriately verified or denied. Further, according to the present example embodiment, since the exception application can be appropriately verified or denied, exception applications intended to neglect a change operation of the software configuration can be suppressed.

Seventh Example Embodiment

A management apparatus and a management method according to a seventh example embodiment of the present invention will be described with reference to FIG. 12. Note that the same components as those in the first to sixth example embodiments described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

Some user U may neglect a change operation of the software configuration of the device 12 despite the fact that the user U has received a countermeasure instruction against vulnerability and finally make an exception application for the purpose of neglecting the change operation immediately before the deadline for change of the software configuration indicated by the countermeasure instruction.

When an exception application is made with an excessively short remaining time to the deadline for change of the software configuration, such an exception application can be evaluated to be an unreliable exception application intended to neglect a change operation of the software configuration as described above. Therefore, such an exception application can be denied.

Accordingly, the management apparatus 10 according to the present example embodiment verifies or denies an exception application based on a point of time related to a change instruction of the software configuration and a point of time when an exception application that is one of the features of exception applications was made. More specifically, the management apparatus 10 according to the present example embodiment verifies or denies an exception application based on a period between a deadline for change of the software configuration, which is one of the points of time related to a change instruction of the software configuration, and a point of time when an exception application was made.

The process related to an exception application in the management method performed by the management apparatus 10 according to the present example embodiment will be described below with reference to FIG. 12. FIG. 12 is a flowchart illustrating the management method performed by the management apparatus 10 according to the present example embodiment. Note that, also in the present example embodiment, the timing when the management apparatus 10 performs the process related to an exception application is not particularly limited in the same manner as the first example embodiment.

Figure 12:
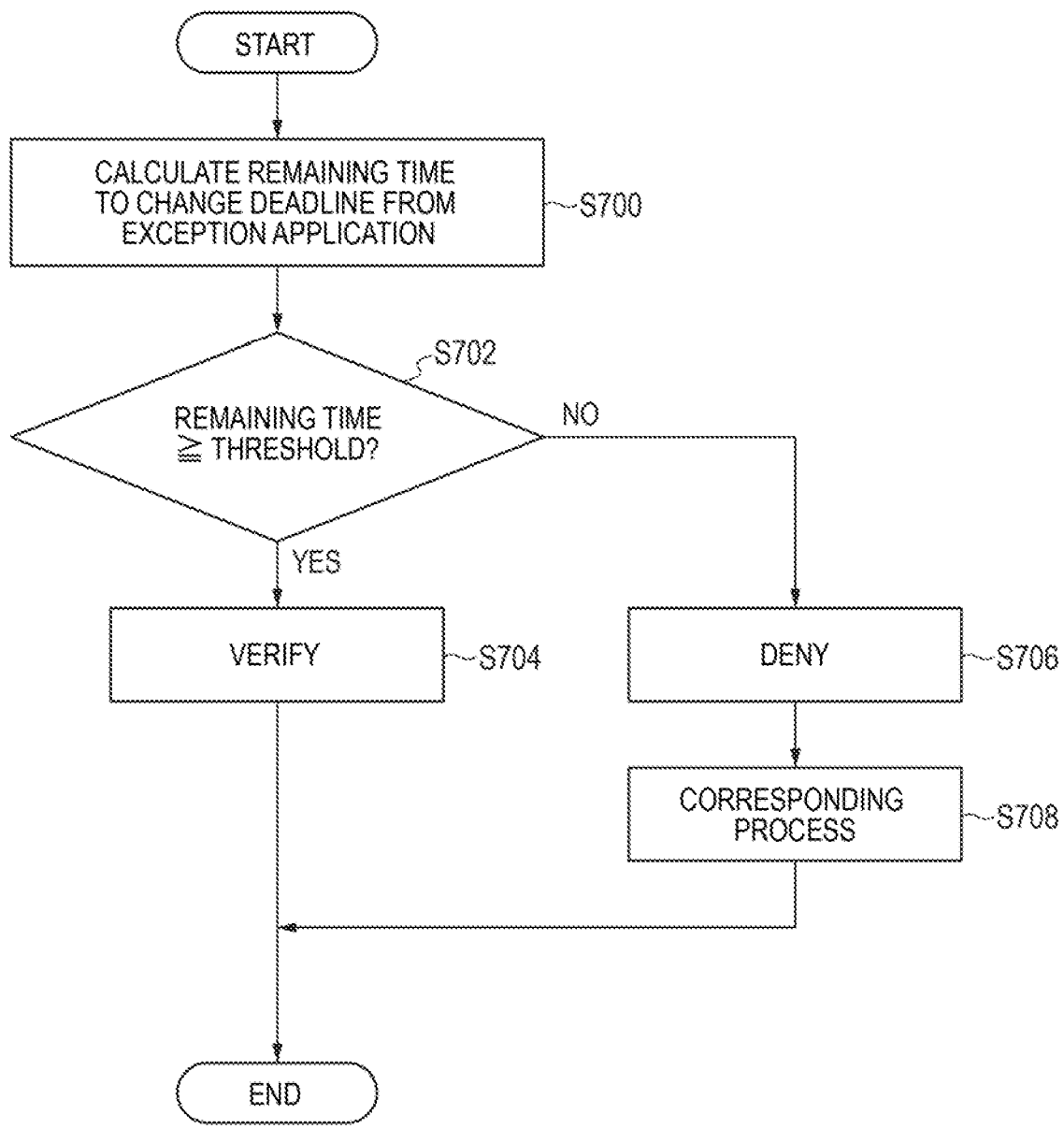
FIG. 12 is a flowchart illustrating a management method performed by a management apparatus according to a seventh example embodiment of the present invention.

As illustrated in FIG. 12, first, at the management apparatus 10, the CPU 101 references the database for countermeasure instructions against vulnerability and the database for exception applications stored in the storage device 104. Accordingly, the CPU 101 calculates a period between a deadline for change of the software configuration as a countermeasure instruction against vulnerability and a point of time when an exception application was made, that is, the remaining time to a deadline for change of the software configuration from an exception application (step S700).

Note that the remaining time can be calculated based on a value for a single exception application made by the same user U or a single exception application targeted and made to the same device 12. Further, the remaining time can be calculated based on a mean value for a plurality of exception applications made by the same user U or a plurality of exception applications targeted and made to the same device 12. As described later in an eleventh example embodiment, when the present example embodiment is combined to any of the first to fifth example embodiments, the mean value can be used as the remaining time.

Next, the CPU 101 compares the remaining time calculated in step S700 with a threshold and determines whether or not the remaining time is greater than or equal to the threshold (step S702). The threshold as used herein is a reference used for evaluating whether or not an exception application was made within an excessively short remaining time to the deadline for change of the software configuration and can be suitably set in the organization 1, for example, may be set to six hours. The threshold related to the remaining time can be stored in advance in a database pre-stored in the storage device 104 or the like so that the CPU 101 can make a reference.

If the remaining time is greater than or equal to the threshold (step S702, YES), the CPU 101 verifies the exception application for which the remaining time has been calculated (step S704). When the remaining time to the deadline for change after an exception application is sufficient in such a way, the exception application can be evaluated to be reliable and thus can be verified.

On the other hand, if the CPU 101 determines that the remaining time is less than the threshold (step S702, NO), the CPU 101 denies the exception application for which the remaining time has been calculated (step S706). When the remaining time to the deadline for change after an exception application is insufficient in such a way, the exception application can be evaluated to be unreliable and thus can be denied.

In response to denying the exception application, the CPU 101 performs a corresponding process related to the denial of the exception application (step S708). The CPU 101 can perform the same corresponding process as that in the first example embodiment.

As described above, according to the present example embodiment, since the exception application is verified or denied based on a period between a deadline for change of the software configuration and a point of time when an exception application was made, the exception application can be appropriately verified or denied. Further, according to the present example embodiment, since the exception application can be appropriately verified or denied, exception applications intended to neglect a change operation of the software configuration can be suppressed.

Eighth Example Embodiment

A management apparatus and a management method according to an eighth example embodiment of the present invention will be described with reference to FIG. 13. Note that the same components as those in the first to seventh example embodiments described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

In response to receiving a countermeasure instruction against vulnerability, some user U may make an exception application for the same reason targeted to one or a plurality of devices 12 for the purpose of neglecting the change operation without carefully considering the necessity of the change of the software configuration of the device 12.

When an excessively large number of exception applications are made for the same reason by the same user U, the exception applications made by the user U can be evaluated to be unreliable exception applications intended to neglect a change operation of the software configuration as described above. Therefore, such an exception application can be denied.

Accordingly, the management apparatus 10 according to the present example embodiment verifies or denies exception applications for each user U who is an applicant of exception applications based on the reason that is one of the features of exception applications, more specifically, based on the number of exception applications made for the same reason.

The process related to an exception application in the management method performed by the management apparatus 10 according to the present example embodiment will be described below with reference to FIG. 13. FIG. 13 is a flowchart illustrating the management method performed by the management apparatus 10 according to the present example embodiment. Note that, also in the present example embodiment, the timing when the management apparatus 10 performs the process related to an exception application is not particularly limited in the same manner as the first example embodiment.

Figure 13:
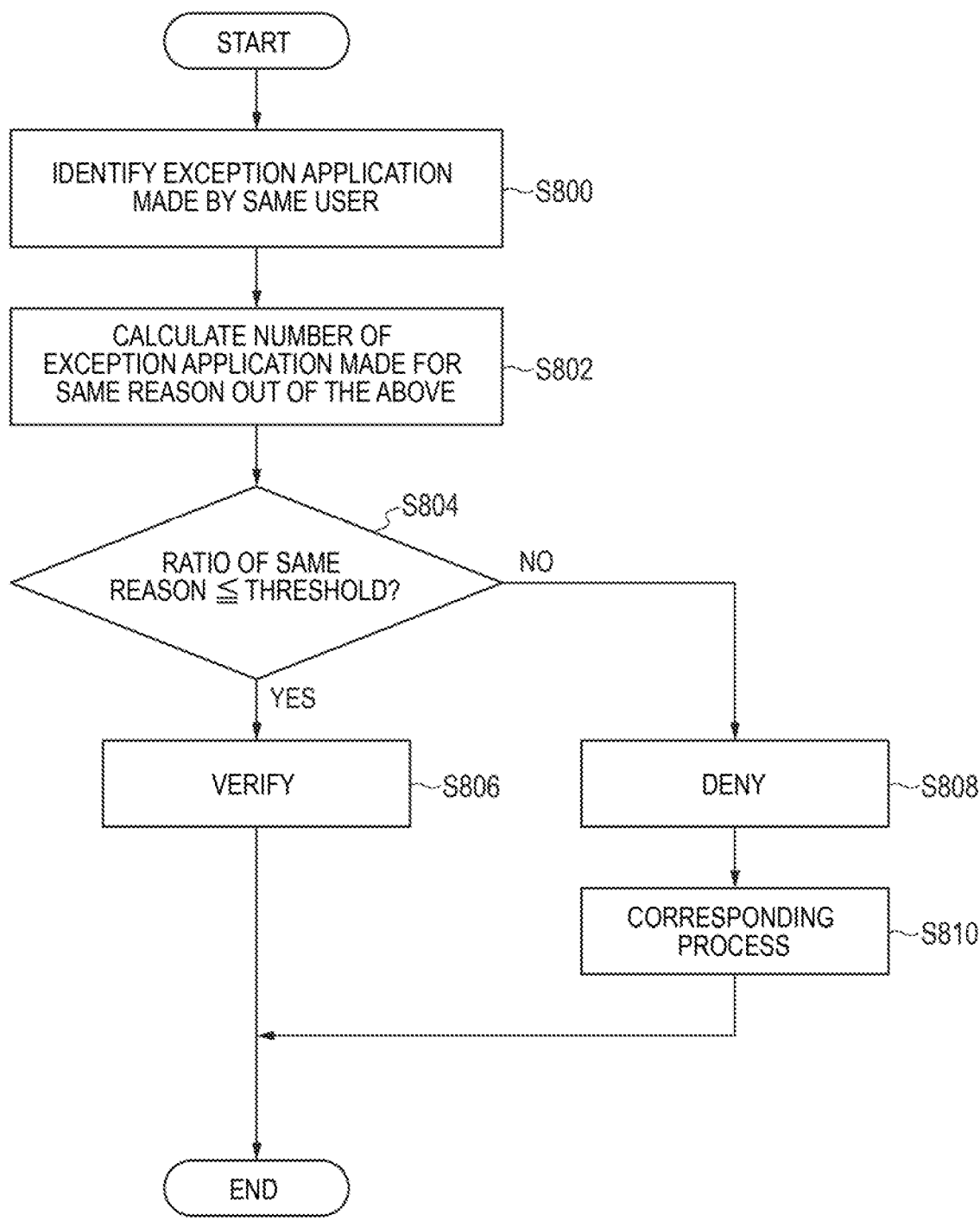
FIG. 13 is a flowchart illustrating a management method performed by a management apparatus according to an eighth example embodiment of the present invention.

As illustrated in FIG. 13, first, at the management apparatus 10, the CPU 101 references a database for exception applications stored in the storage device 104 and identifies exception applications targeted and made to one or a plurality of devices 12 by the same user U (step S800). In identifying the exception applications, the CPU 101 can identify exception applications made by the same user U in a certain period such as on a weekly basis, on a monthly basis, on a quarterly basis, on a half yearly basis, on a yearly basis, or the like, for example.

Next, the CPU 101 calculates the number of exception applications made for the same reason out of the exception applications identified in step S800 (step S802). The CPU 101 determines whether or not the reason for exception applications are the same prior to calculation of the number of exception applications. Note that the reasons for exception applications to be determined as the same or not may be a reason selected by the user U from options of fixed form reasons when the exception application is made or may be a reason input by the user U in a form of a free text when the exception application is made. For reasons input in a form of a free text, it can be determined that the reasons are the same not only when the wordings of the reasons match each other but also the summaries of the reasons match each other even when the wordings differ from each other.

The number of exception applications to be calculated can be the total number of two or more exception applications made for the same reason. A calculation method of the number of exception applications in accordance with the total number will now be described with a case, as an example, where a particular user U has targeted five device 12A, device 12B, device 12C, device 12D, and device 12E included in the devices 12 and made exception applications for "reason R1" and "reason R2". In such a case, the number of exception applications can be calculated as the total number obtained by calculating, for one reason sentence, the number of other devices corresponding to the reason sentence when viewed from one of the devices corresponding to the reason sentence and adding the number of other devices calculated for the different reason sentence thereto.

For example, a first case is considered where the user U has made exception applications to the device 12A for "reason R1", to the device 12B for "reason R1", to the device 12C for "reason R1", to the device 12D for "reason R1", and to the device 12E for "reason R1", respectively. In such a case, other devices corresponding to "reason R1" are four devices, namely, the device 12B, the device 12C, the device 12D, and the device 12E when viewed from the device 12A corresponding to "reason R1", and therefore the number of exception applications made for the same reason, "reason R1", is four. Therefore, in the first case, the number of exception applications made for the same reason is four.

Further, for example, a second case is considered where the user U has made exception applications to the device 12A for "reason R1", to the device 12B for "reason R1", to the device 12C for "reason R2", to the device 12D for "reason R2", and to the device 12E for "reason R1", respectively. In such a case, other devices corresponding to "reason R1" are two devices, namely, the device 12B and the device 12E when viewed from the device 12A corresponding to "reason R1", and therefore the number of exception applications made for the same reason, "reason R1", is two.

Further, another device corresponding to "reason R2" is one device, namely, the device 12D when viewed from the device 12C corresponding to "reason R2", and therefore the number of exception applications made for the same reason, "reason R2", is one. Therefore, in the second case, the number of exception applications made for the same reason is three that is the sum of two and one.

Further, for example, a third case is considered where the user U has made exception applications to the device 12A for "reason R1", to the device 12B for "reason R1", to the device 12C for "reason R2", to the device 12D for "reason R2", and to the device 12E for "reason R2", respectively. In such a case, another device corresponding to "reason R1" is one device, namely, the device 12B when viewed from the device 12A corresponding to "reason R1", and therefore the number of exception applications made for the same reason, "reason R1", is one. Further, other devices corresponding to "reason R2" are two devices, namely, the device 12D and the device 12E when viewed from the device 12C corresponding to "reason R2", and therefore the number of exception applications made for the same reason, namely, "reason R2" is two. Therefore, in the third case, the number of exception applications made for the same reason is three that is the sum of one and two.

Note that the calculation method of the number of exception applications made for the same reason is not limited to the method of using the total number of two or more exception applications made for the same reason as described above. For example, the largest number of the numbers of two or more exception applications made for the same reason may be used as the number of exception applications made for the same reason. According to such a calculation method, the numbers of exception applications made for the same reason in the first case, the second case, and the third case described above are four, two, and two, respectively.

Next, the CPU 101 calculates a ratio of the same reason that is the ratio of the number of exception applications made for the same reason calculated in step S802 to the number of exception applications identified in step S800. Subsequently, the CPU 101 compares the calculated ratio of the same reason with a threshold and determines whether or not the ratio of the same reason is less than or equal to the threshold (step S804). The threshold as used herein is a reference used for evaluating whether or not an excessively large number of exception applications have been made for the same reason by the same user U and can be suitably set in the organization 1. The threshold related to the ratio of the same reason can be stored in advance in a database pre-stored in the storage device 104 or the like so that the CPU 101 can make a reference. Note that, instead of comparing the calculated ratio of the same reason with a threshold, it may be possible to compare the number of exception applications of the same reason with a suitably set threshold.

If the CPU 101 determines that the ratio of the same reason is less than or equal to the threshold (step S804, YES), the CPU 101 verifies the exception application targeted and made to one or a plurality of devices 12 by the same user U (step S806). When the ratio of the same reason is low in such a way, the exception application made by the user U can be evaluated to be reliable and thus can be verified.

On the other hand, if the CPU 101 determines that the ratio of the same reason exceeds the threshold (step S804, NO), the CPU 101 denies the exception application targeted and made to one or a plurality of devices 12 by the same user U (step S808). When the ratio of the same reason is high in such a way, the exception application made by the user U can be evaluated to be unreliable and thus can be denied.

In response to denying the exception application, the CPU 101 performs a corresponding process related to the denial of the exception application (step S810). The CPU 101 can perform the same corresponding process as that in the first example embodiment.

As described above, according to the present example embodiment, an exception application for each user U who is an applicant for the exception application is verified or denied based on the number of exception applications made for the same reason. Therefore, according to the present example embodiment, the exception application targeted and made to the device 12 can be appropriately verified or denied. Further, according to the present example embodiment, since the exception application can be appropriately verified or denied, exception applications intended to neglect a change operation of the software configuration can be suppressed.

Ninth Example Embodiment

A management apparatus and a management method according to a ninth example embodiment of the present invention will be described with reference to FIG. 14. Note that the same components as those in the first to eighth example embodiments described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

In the above first to eighth example embodiments, the case where, in the process related to exception applications, a quantity such as the number of times, a period, or the like related to a feature of exception applications is compared with a single-level threshold to deny or verify the exception application has been described. However, the threshold is not necessarily limited to those having a single level. A multi-level threshold may be used for comparison with the quantity related to a feature of exception applications. With a use of the multi-level threshold, different processes can be performed stepwise as the corresponding process for the denial of an exception application.

In the present example embodiment, a case where the number of times of exception applications is compared with a multi-level threshold in the first example embodiment will be described with reference to FIG. 14. FIG. 14 is a flowchart illustrating the management method performed by the management apparatus 10 according to the present example embodiment.

Figure 14:
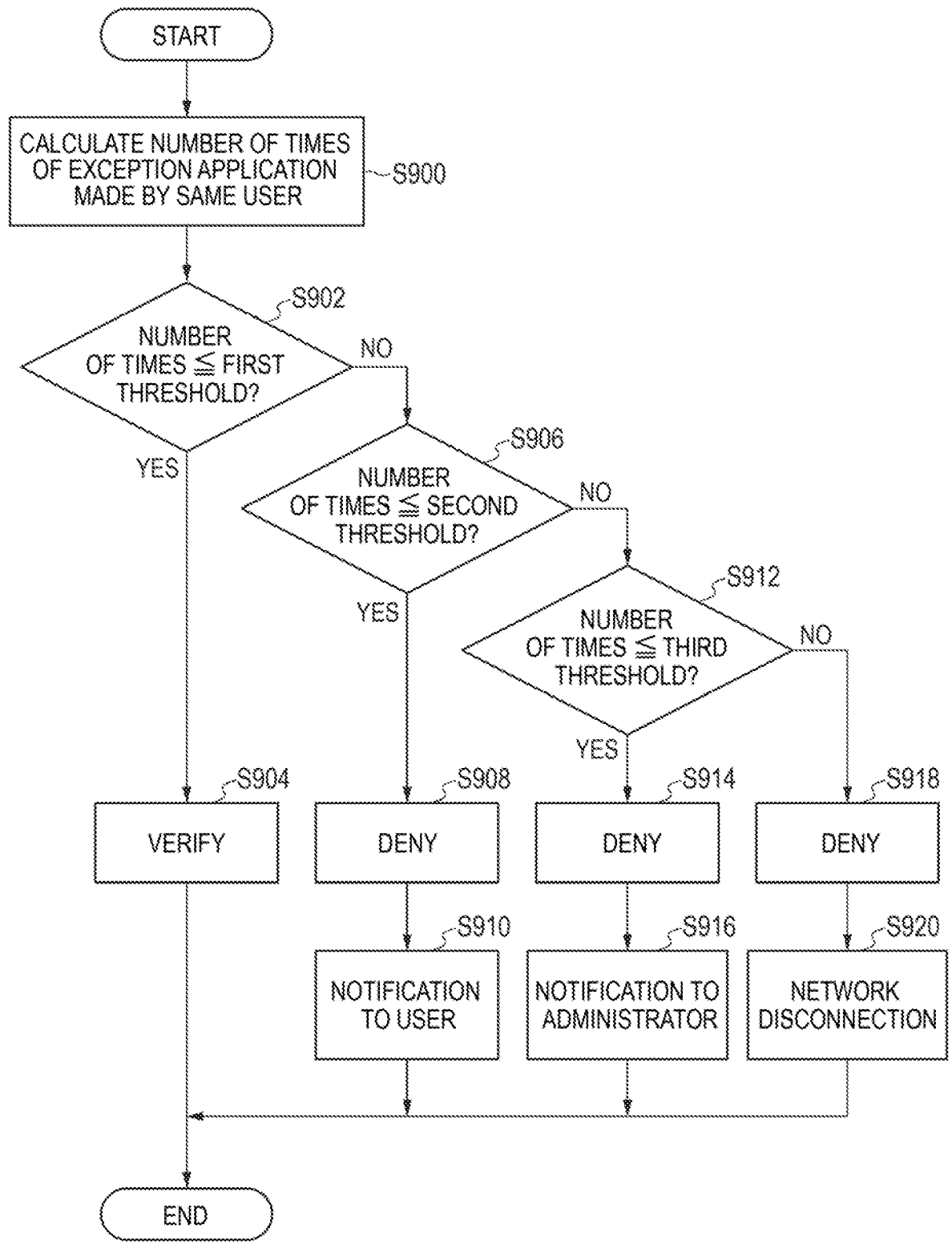
FIG. 14 is a flowchart illustrating a management method performed by a management apparatus according to a ninth example embodiment of the present invention.

As illustrated in FIG. 14, first, at the management apparatus 10, the CPU 101 calculates the number of times of exception applications made by the same user U in the same manner as in the first example embodiment (step S900).

Next, the CPU 101 compares the number of times of exception applications calculated in step S900 with a first threshold and determines whether or not the number of times of exception applications is less than or equal to the first threshold (step S902). The first threshold as used herein is the first upper limit number of times, which can be set in the same manner as the threshold in the first example embodiment and stored in advance in a database stored in the storage device 104 or the like.

If the CPU 101 determines that the number of times of exception applications is less than or equal to the first threshold (step S902, YES), the CPU 101 verifies the exception application in the same manner as in the first example embodiment (step S904).

On the other hand, if the CPU 101 determines that the number of times of exception applications exceeds the first threshold (step S902, NO), the CPU 101 compares the number of times of exception applications with a second threshold and determines whether or not the number of times of exception applications is less than or equal to the second threshold (step S906). The second threshold as used herein is the second upper limit number of times that is larger than the first threshold, which can be set in the same manner as the threshold in the first example embodiment and stored in advance in a database stored in the storage device 104 or the like.

If the CPU 101 determines that the number of times of exception applications is less than or equal to the second threshold (step S906, YES), the CPU 101 denies the exception application in the same manner as in the first example embodiment (step S908). Next, the CPU 101 performs notification to the user U in the same manner as in the first example embodiment as a corresponding process for the denial of the exception application (step S910). Note that, in such a case, instead of the notification to the user U or in addition to the notification, at least any of notification to the administrator A and disconnection of the device 12 from a network may be performed in the same manner as in the first example embodiment.

On the other hand, if the CPU 101 determines that the number of times of exception applications exceeds the second threshold (step S906, NO), the CPU 101 compares the number of times of exception applications with a third threshold and determines whether or not the number of times of exception applications is less than or equal to the third threshold (step S912). The third threshold as used herein is the third upper limit number of times that is larger than the second threshold, which can be set in the same manner as the threshold in the first example embodiment and stored in advance in a database stored in the storage device 104 or the like.

If the CPU 101 determines that the number of times of exception applications is less than or equal to the third threshold (step S912, YES), the CPU 101 denies the exception application in the same manner as in the first example embodiment (step S914). Next, the CPU 101 performs notification to the administrator A in the same manner as in the first example embodiment as a corresponding process for the denial of the exception application (step S916). Note that, in such a case, instead of the notification to the administrator A or in addition to the notification, at least any of notification to the user U and disconnection of the device 12 from a network may be performed in the same manner as in the first example embodiment.

On the other hand, if the CPU 101 determines that the number of times of exception applications exceeds the third threshold (step S912, NO), the CPU 101 denies the exception application in the same manner as in the first example embodiment (step S918). Next, the CPU 101 performs disconnection of the device 12 from a network in the same manner as in the first example embodiment as a corresponding process for the denial of the exception application (step S920). Note that, in such a case, instead of the disconnection of the device 12 from the network or in addition to the disconnection, at least any of notification to the user U and notification to the administrator A may be performed in the same manner as in the first example embodiment.

As described in the present example embodiment, when denying an exception application, it is possible to change and perform the corresponding process for denial of an exception application stepwise in accordance with the number of times of exception applications. Note that, although the example in which the corresponding process for the denial of the exception application is performed in three steps has been described above, the corresponding process may be changed and performed in two steps or four or more steps in a similar manner.

Note that, also in the second to eighth example embodiments, it is possible to change and perform the corresponding process for denial of the exception application stepwise by using a multi-level threshold in the same manner as in the present example embodiment.

Tenth Example Embodiment

A management apparatus and a management method according to a tenth example embodiment of the present invention will be described with reference to FIG. 15. Note that the same components as those in the first to ninth example embodiments described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

As described in the above ninth example embodiment, it is possible to perform different processes stepwise as the corresponding process for the denial of the exception application by using a multi-level threshold. In the present example embodiment, a case where the elapsed time from a change instruction of the software configuration to an exception application is compared with a multi-level threshold in the sixth example embodiment will be described with reference to FIG. 15. FIG. 15 is a flowchart illustrating the management method performed by the management apparatus 10 according to the present example embodiment.

Figure 15:
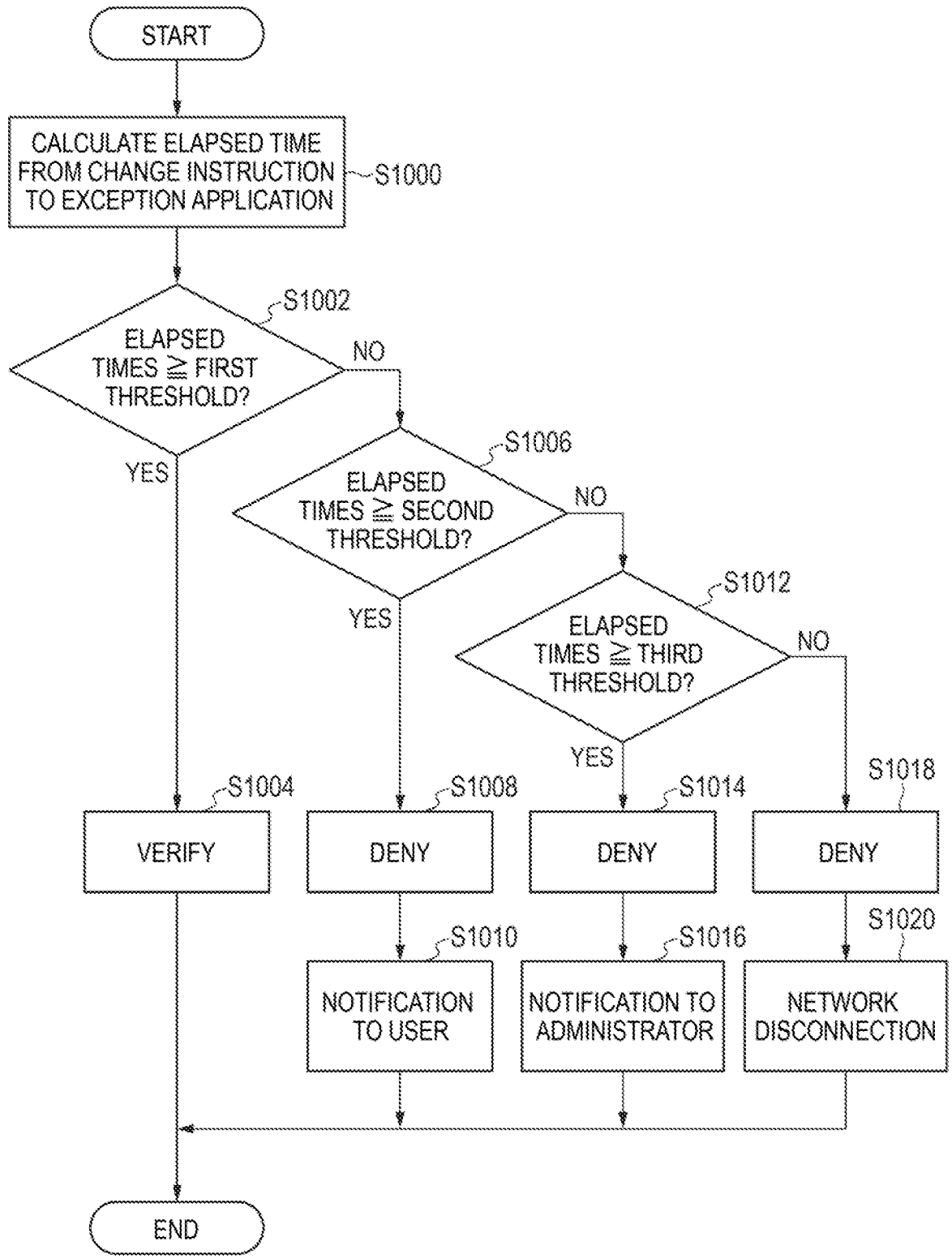
FIG. 15 is a flowchart illustrating a management method performed by a management apparatus according to a tenth example embodiment of the present invention.

As illustrated in FIG. 15, first, at the management apparatus 10, the CPU 101 calculates the elapsed time from a change instruction of the software configuration to an exception application in the same manner as in the sixth example embodiment (step S1000).

Next, the CPU 101 compares the elapsed time calculated in step S1000 with a first threshold and determines whether or not the elapsed time is greater than or equal to the first threshold (step S1002). The first threshold as used herein can be set in the same manner as the threshold in the sixth example embodiment and stored in advance in a database stored in the storage device 104 or the like.

If the CPU 101 determines that the elapsed time is greater than or equal to the first threshold (step S1002, YES), the CPU 101 verifies the exception application in the same manner as in the sixth example embodiment (step S1004).

On the other hand, if the CPU 101 determines that the elapsed time is less than the first threshold (step S1002, NO), the CPU 101 compares the elapsed time with a second threshold and determines whether or not the elapsed time is greater than or equal to the second threshold (step S1006). The second threshold as used herein is a threshold smaller than the first threshold, which can be set in the same manner as the threshold in the sixth example embodiment and stored in advance in a database stored in the storage device 104 or the like.

If the CPU 101 determines that the elapsed time is greater than or equal to the second threshold (step S1006, YES), the CPU 101 denies the exception application in the same manner as in the sixth example embodiment (step S1008). Next, the CPU 101 performs notification to the user U in the same manner as in the first example embodiment as a corresponding process for the denial of the exception application (step S1010). Note that, in such a case, instead of the notification to the user U or in addition to the notification, at least any of notification to the administrator A and disconnection of the device 12 from a network may be performed in the same manner as in the first example embodiment.

On the other hand, if the CPU 101 determines that the elapsed time is less than the second threshold (step S1006, NO), the CPU 101 compares the elapsed time with a third threshold and determines whether or not the elapsed time is greater than or equal to the third threshold (step S1012). The third threshold as used herein is a threshold smaller than the second threshold, which can be set in the same manner as the threshold in the sixth example embodiment and stored in advance in a database stored in the storage device 104 or the like.

If the CPU 101 determines that the elapsed time is greater than or equal to the third threshold (step S1012, YES), the CPU 101 denies the exception application in the same manner as in the sixth example embodiment (step S1014). Next, the CPU 101 performs notification to the administrator A in the same manner as in the first example embodiment as a corresponding process for the denial of the exception application (step S1016). Note that, in such a case, instead of the notification to the administrator A or in addition to the notification, at least any of notification to the user U and disconnection of the device 12 from a network may be performed in the same manner as in the first example embodiment.

On the other hand, if the CPU 101 determines that the elapsed time is less than the third threshold (step S1012, NO), the CPU 101 denies the exception application in the same manner as in the sixth example embodiment (step S1018). Next, the CPU 101 performs disconnection of the device 12 from a network in the same manner as in the first example embodiment as a corresponding process for the denial of the exception application (step S1020). Note that, in such a case, instead of the disconnection of the device 12 from the network or in addition to the disconnection, at least any of notification to the user U and notification to the administrator A may be performed in the same manner as in the first example embodiment.

As described in the present example embodiment, when denying an exception application, it is possible to change and perform the corresponding process for the denial of an exception application stepwise in accordance with the elapsed time. Note that, although the example in which the corresponding process for the denial of the exception application is performed in three steps has been described, the corresponding process may be changed and performed stepwise in two steps or four or more steps in a similar manner.

Note that, also in the first to fifth and seventh and eighth example embodiments, it is possible to change and perform the corresponding process for the denial of the exception application stepwise by using a multi-level threshold in the same manner as in the present example embodiment.

Eleventh Example Embodiment

A management apparatus and a management method according to an eleventh example embodiment of the present invention will be described with reference to FIG. 16. Note that the same components as those in the first to tenth example embodiments described above are labeled with the same references, and the description thereof will be omitted or simplified.

The configuration of the system 2 including the management apparatus 10 and the device 12 according to the present example embodiment is the same as the configuration in the first example embodiment illustrated in FIG. 1 and FIG. 2. The present example embodiment is different from the first example embodiment in the process related to an exception application in the management method performed by the management apparatus 10.

The management method according to the first to eighth example embodiments may be performed in combination to make the final verification or denial of an exception application based on a result of verification or denial of an exception application according to the combined management method. In the present example embodiment, a case of performing any of the management methods according to the first to fifth example embodiments and any of the management methods according to the sixth and seventh example embodiments in combination will be described below with reference to FIG. 16. FIG. 16 is a flowchart illustrating the management method performed by the management apparatus 10 according to the present example embodiment.

Figure 16:
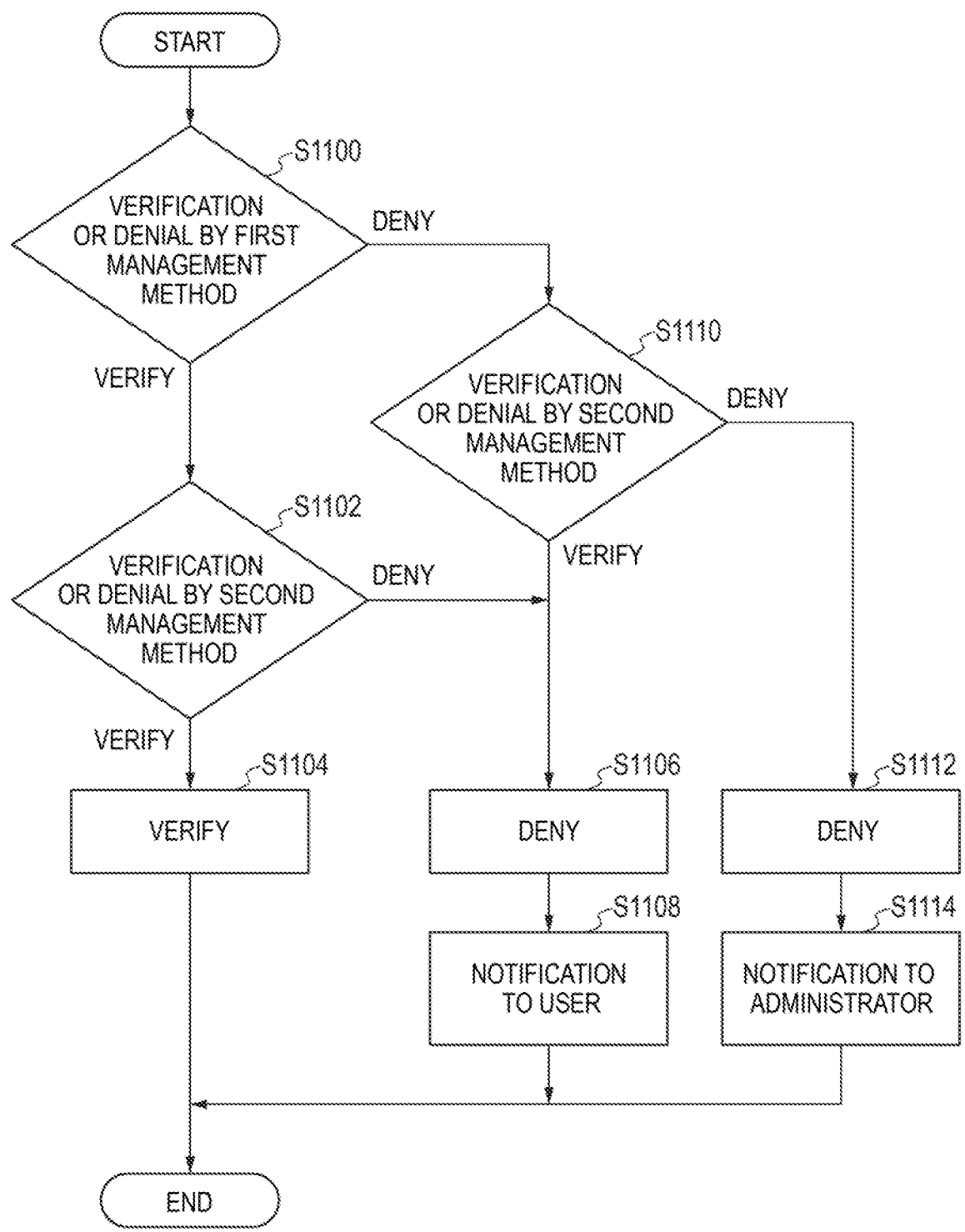
FIG. 16 is a flowchart illustrating a management method performed by a management apparatus according to an eleventh example embodiment of the present invention.

As illustrated in FIG. 16, first, at the management apparatus 10, the CPU 101 performs a first management method to verify or deny an exception application (step S1100). The CPU 101 uses any of the management methods according to the first to fifth example embodiments as the first management method.

If the CPU 101 verifies the exception application by using the first management method (step S1100, verify), the CPU 101 performs a second management method to verify or deny the exception application (step S1102). The CPU 101 uses any of the management methods according to the sixth and seventh example embodiments as the second management method.

If the CPU 101 verifies the exception application by using the second management method (step S1102, verify), the CPU 101 finally verifies the exception application (step S1104).

On the other hand, if the CPU 101 denies the exception application by using the second management method (step S1102, deny), the CPU 101 finally denies the exception application (step S1106). Next, the CPU 101 performs notification to the user U in the same manner as in the first example embodiment as a corresponding process for the denial of the exception application (step S1108). Note that, in such a case, instead of the notification to the user U or in addition to the notification, at least any of notification to the administrator A and disconnection of the device 12 from a network may be performed in the same manner as in the first example embodiment.

In contrast, if the CPU 101 denies the exception application by using the first management method (step S1100, deny), the CPU 101 performs the second management method to verify or deny the exception application (step S1110). The CPU 101 uses any of the management methods according to the sixth and seventh example embodiments as the same second management method as in step S1102.

If the CPU 101 verifies the exception application by using the second management method (step S1110, verify), the CPU 101 finally denies the exception application (step S1106). Next, the CPU 101 performs notification to the user U in the same manner as in the first example embodiment as a corresponding process for the denial of the exception application (step S1108). Note that, in such a case, instead of the notification to the user U or in addition to the notification, at least any of notification to the administrator A and disconnection of the device 12 from a network may be performed in the same manner as in the first example embodiment.

On the other hand, if the CPU 101 denies the exception application by using the second management method (step S1110, deny), the CPU 101 finally denies the exception application (step S1112). Next, the CPU 101 performs notification to the administrator A in the same manner as in the first example embodiment as a corresponding process for the denial of the exception application (step S1114). Note that, in such a case, instead of the notification to the administrator A or in addition to the notification, at least any of notification to the user U and disconnection of the device 12 from a network may be performed in the same manner as in the first example embodiment.

As described in the present example embodiment, a plurality of management methods are performed in combination to make the final verification or denial of an exception application based on a result of verification or denial of the exception application according to the combined management method.

Note that the combination of the management methods is not limited to the above case, and the CPU 101 can perform the management method in various combinations.

For example, the CPU 101 can use any of the management methods according to the sixth and seventh example embodiments as the first management method described above and use any of the management methods according to the first to fifth example embodiments as the second management method described above.

Further, for example, the CPU 101 can use any of the management methods according to the first to fifth example embodiments as the first management method described above and use the management method according to the eighth example embodiment as the second management method described above. Further, for example, the CPU 101 can use the management method according to the eighth example embodiment as the first management method described above and use any of the management methods according to the first to fifth example embodiments as the second management method described above.

Further, for example, the CPU 101 can use any of the management methods according to the sixth and seventh example embodiments as the first management method described above and use the management method according to the eighth example embodiment as the second management method described above. Further, for example, the CPU 101 can use the management method according to the eighth example embodiment as the first management method described above and use any of the management methods according to the sixth and seventh example embodiments as the second management method described above.

Further, for example, the CPU 101 can use any of the management methods according to the first to fifth example embodiments as the first management method described above and use any of the other management methods according to the first to fifth example embodiments as the second management method described above. More specifically, for example, the CPU 101 can use the management method according to the first example embodiment as the first management method described above and use the management method according to the third example embodiment as the second management method described above. Further, for example, the CPU 101 can use the management method according to the third example embodiment as the first management method described above and use the management method according to the first example embodiment as the second management method described above.

Further, for example, the CPU 101 can use the management method according to the sixth example embodiment as the first management method described above and use the management method according to the seventh example embodiment as the second management method described above. Further, for example, the CPU 101 can use the management method according to the seventh example embodiment as the first management method described above and use the management method according to the sixth example embodiment as the second management method described above.

Further, for example, the CPU 101 is not necessarily required to perform the second management method after the first management method and can perform both the methods at the same time regardless of the order of both the methods. The CPU 101 can change and perform the corresponding process for the denial of an exception application in accordance with a combination of a result of verification or denial of the exception application according to the first management method and a result of verification or denial of the exception application according to the second management method.

Further, for example, the CPU 101 can set any weighting on the first management method and the second management method described above for use, respectively. For example, the CPU 101 can provide weighting values weighted by weights different from each other to a case where an exception application is denied by the first management method and a case where an exception application is denied by the second management method, respectively. In such a case, the CPU 101 calculates a sum value of the weighting value provided to the case where an exception application is verified or denied by the first management method and the weighting value provided to the case where an exception application is verified or denied by the second management method. Next, the CPU 101 can change and perform the corresponding process for the denial of the exception application in accordance with the sum value.

Further, although the case where two management methods, namely, the first management method and the second management method are performed in combination has been described above, the present invention is not limited thereto. The CPU 101 can perform three or more management methods in combination.

Another Example Embodiment

Figure 17:
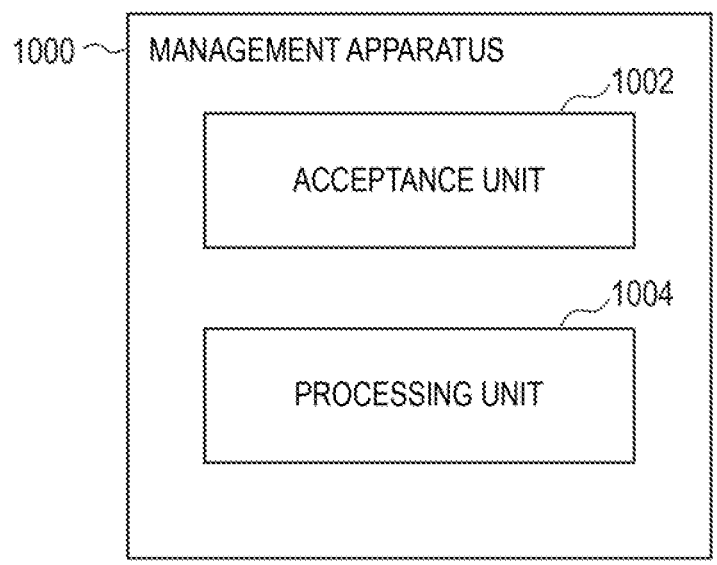
FIG. 17 is a block diagram illustrating a function configuration of a management apparatus according to another example embodiment of the present invention.

The management apparatus described in each of the above example embodiments can be configured as illustrated in FIG. 17 according to another example embodiment. FIG. 17 is a block diagram illustrating the function configuration of a management apparatus according to another example embodiment.

As illustrated in FIG. 17, a management apparatus 1000 has an acceptance unit 1002 that accepts, from an applicant, an application intended not to change a software configuration of a device and a processing unit 1004 that denies the application based on the number of times of applications accepted by the acceptance unit 1002.

According to the management apparatus 1000 of another example embodiment, since an application is denied based on the number of times of applications intended not to change the software configuration of a device, the application can be appropriately denied.

Modified Example Embodiments

The present invention is not limited to the example embodiments described above, and various modifications are possible.

For example, the management apparatus 10 according to the example embodiment described above may be formed of a single apparatus or may be formed of two or more physically separate apparatuses connected to each other by wired connection or wireless connection.

Further, although the case where the management apparatus and both the management terminal 14 and the network disconnecting apparatus 16 are formed of devices discrete from each other has been described as an example in the above example embodiments, the present invention is not limited thereto. For example, the management apparatus 10 and the management terminal 14 may be formed of a single device. Further, for example, the management apparatus 10 and the network disconnecting apparatus 16 may also be formed of a single device.

Further, although the case where the device 12 is a managed target of the management apparatus 10 has been described as an example in the above example embodiments, the management terminal 14, the firewall/proxy server 18, the network disconnecting apparatus 16, or the like may be a managed target of the management apparatus 10 as the device 12.

Further, although the management apparatus 10 is configured to transmit a countermeasure instruction against vulnerability of the device 12 in the above example embodiments, the present invention is not limited thereto. For example, the management apparatus 10 may be configured to, when software that is not allowed to be installed as a policy of the organization 1 has been installed in the device 12, transmit a countermeasure instruction requesting uninstallation of the software. Alternatively, the management apparatus 10 may be configured to, when software that is required to be installed as a policy of the organization 1 has not yet been installed in the device 12, transmit a countermeasure instruction requesting installation of the software.

Further, although the case where the storage device 104 stores respective databases that store vulnerability information, configuration information, results of vulnerability investigation, and exception applications has been described in the above example embodiments, the present invention is not limited thereto. For example, instead of storing these databases in the storage device 104, a database server storing these databases may be installed separately from the management apparatus 10.

Further, although the case where the number of times of exception applications is calculated has been described as an example in the above example embodiments, the present invention is not limited thereto. For example, the number of times of exception applications may be calculated as a relative number of times indicating a ratio of the number of times to the number of times of change instructions of a software configuration.

Further, the scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

A service implemented by the function of each of the example embodiments described above may be provided to a user in a form of Software as a Service (SaaS).

The whole or part of the example embodiments disclosed above can be described as, but not limited to, the following supplementary notes.

(Supplementary Note 1)

A management apparatus comprising:

an acceptance unit that accepts, from an applicant, an application intended not to change a software configuration of a device; and a processing unit that denies the application based on the number of times of applications accepted by the acceptance unit.

(Supplementary Note 2)

The management apparatus according to supplementary note 1, wherein the processing unit performs notification or disconnection of the device from a network when denying the application.

(Supplementary Note 3)

The management apparatus according to supplementary note 1 or 2, wherein the processing unit denies the applications on the applicant basis based on the number of times of applications made by the same applicant.

(Supplementary Note 4)

The management apparatus according to supplementary note 3, wherein the acceptance unit accepts the application targeted to a plurality of devices and made by the same applicant, and wherein the processing unit denies the application made by the applicant based on the number of times of applications made by the same applicant.

(Supplementary Note 5)

The management apparatus according to any one of supplementary notes 1 to 3, wherein the processing unit denies the applications targeted to the same device on the device basis based on the number of times of applications targeted to the same device.

(Supplementary Note 6)

The management apparatus according to supplementary note 1 or 2, wherein the acceptance unit accepts the application targeted to a plurality of devices that are similar to each other, and wherein based on a difference number of times that is a difference between the number of times of applications targeted to one device of the plurality of devices and the number of times of applications targeted to another device of the plurality of devices, the processing unit denies the application targeted to the one device.

(Supplementary Note 7)

The management apparatus according to supplementary note 1 or 2, wherein the acceptance unit accepts the applications in a first period and a second period that is different from the first period, and wherein the processing unit denies the application based on a difference number of times that is a difference between the number of times of applications in the first period and the number of times of applications in the second period.

(Supplementary Note 8)

The management apparatus according to any of one supplementary notes 1 to 7, wherein the acceptance unit accepts the application responding to a change instruction indicating a change of the software configuration of the device, and wherein the processing unit denies the application based on a point of time related to the change instruction and a point of time when the application was made.

(Supplementary Note 9)

The management apparatus according to supplementary note 8, wherein the processing unit denies the application based on a period between a point of time when the change instruction was provided and the point of time when the application was made.

(Supplementary Note 10)

The management apparatus according to supplementary note 8 or 9, wherein the change instruction indicates a change of the software configuration by a deadline for change, and wherein the processing unit denies the application based on a period between the point of time when the application was made and the deadline for change.

(Supplementary Note 11)

The management apparatus according to any one of supplementary notes 1 to 10, wherein the processing unit denies the application based on the number of applications made for the same reason out of the applications.

(Supplementary Note 12)

The management apparatus according to any one of supplementary notes 1 to 11, wherein the processing unit performs first notification or disconnection of the device from a network when the number of times of applications or the difference number of times exceeds a first threshold and performs second notification or disconnection of the device from the network when the number of times of application or the difference number of times exceeds a second threshold that is greater than the first threshold.

(Supplementary Note 13)

The management apparatus according to any one of supplementary notes 1 to 11, wherein the processing unit performs first notification or disconnection of the device from a network when the number of times of applications made by the same applicant exceeds a first threshold or when the number of times of applications targeted to the same device exceeds a second threshold, and wherein the processing unit performs second notification or disconnection of the device from the network when the number of times of applications made by the same applicant exceeds a first threshold and the number of times of applications targeted to the same device exceeds a second threshold.

(Supplementary Note 14)

The management apparatus according to any one of supplementary notes 8 to 10, wherein the processing unit performs first notification or disconnection of the device from a network when the number of times of applications or the difference number of times exceeds a first threshold or when a period between a point of time related to the change instruction and a point of time of the application is less than a second threshold, and wherein the processing unit performs second notification or disconnection of the device from a network when the number of times of applications or the difference number of times exceeds a first threshold and a period between a point of time related to the change instruction and a point of time of the application is less than a second threshold (Supplementary Note 15)

A management method comprising:

accepting an application intended not to change a software configuration of a device; and denying the application based on the number of times of accepted applications.

(Supplementary Note 16)

A storage medium storing a program that causes a computer to:

accept an application intended not to change a software configuration of a device; and deny the application based on the number of times of accepted applications.

As described above, while the present invention has been described with reference to the example embodiments, the present invention is not limited to these example embodiments described above. Various modifications that can be appreciated by those skilled in the art can be made to the configuration and details of the present invention within the scope of the present invention.

This application is based upon and claims the benefit of priority from Japanese Patent Application No. 2018-034790, filed on Feb. 28, 2018, the disclosure of which is incorporated herein in its entirety by reference.

REFERENCE SIGNS LIST 1 organization
2 system
10 management apparatus
12 device
14 management terminal
16 network disconnecting device
18 firewall/proxy server
20 intra-organization network
22 Internet
24 information delivery server
1000 management apparatus
1002 acceptance unit
1004 processing unit
A administrator
U user

The invention claimed is:

1. A management apparatus comprising:
at least one memory configured to store instructions; and
at least one processor configured to execute the instructions to:
accept, from an applicant, an application intended not to change a software configuration of a device; and
deny the application based on a number of times of applications accepted, wherein the at least one processor is further configured to execute the instructions to accept the application targeted to a plurality of devices that are similar to each other, and
based on a difference number of times that is a difference between the number of times of applications targeted to one device of the plurality of devices and the number of times of applications targeted to another device of the plurality of devices, deny the application targeted to the one device.

2. The management apparatus according to claim 1, wherein the at least one processor is further configured to execute the instructions to notify or disconnect the device from a network when denying the application.

3. The management apparatus according to claim 1, wherein the at least one processor is further configured to execute the instructions to deny the application based on the number of times of applications made by the same applicant.

4. The management apparatus according to claim 3, wherein the at least one processor is further configured to execute the instructions to accept the application targeted to a plurality of devices and made by the same applicant, and
deny the application made by the applicant based on the number of times of applications made by the same applicant.

5. The management apparatus according to claim 1, wherein the at least one processor is further configured to execute the instructions to deny the application targeted to the same device based on the number of times of applications targeted to the same device.

6. The management apparatus according to claim 1, wherein the at least one processor is further configured to execute the instructions to accept the application in a first period and a second period that is different from the first period, and
deny the application based on a difference number of times that is a difference between the number of times of applications in the first period and the number of times of applications in the second period.

7. The management apparatus according to claim 1, wherein the at least one processor is further configured to execute the instructions to accept the application responding to a change instruction indicating a change of the software configuration of the device, and
deny the application based on a point of time related to the change instruction and a point of time when the application was made.

8. The management apparatus according to claim 7, wherein the at least one processor is further configured to execute the instructions to deny the application based on a period between a point of time when the change instruction was provided and the point of time when the application was made.

9. The management apparatus according to claim 7, wherein the change instruction indicates a change of the software configuration by a deadline for change, and wherein the at least one processor is further configured to execute the instructions to deny the application based on a period between the point of time when the application was made and the deadline for change.

10. The management apparatus according to claim 7, wherein the at least one processor is further configured to execute the instructions to notify or disconnect the device from a network when the number of times of applications or the difference number of times exceeds a first threshold or when a period between a point of time related to the change instruction and a point of time of the application is less than a second threshold, and
notify or disconnect the device from a network when the number of times of applications or the difference number of times exceeds the first threshold and the period between the point of time related to the change instruction and the point of time of the application is less than the second threshold.

11. The management apparatus according to claim 1, wherein the at least one processor is further configured to execute the instructions to deny the application based on the number of applications made for the same reason out of the applications.

12. The management apparatus according to claim 1, wherein the at least one processor is further configured to execute the instructions to notify or disconnect the device from a network when the number of times of applications or the difference number of times exceeds a first threshold, and notify or disconnect the device from the network when the number of times of application or the difference number of times exceeds a second threshold that is greater than the first threshold.

13. The management apparatus according to claim 1, wherein the at least one processor is further configured to execute the instructions to notify or disconnect the device from a network when the number of times of applications made by the same applicant exceeds a first threshold or when the number of times of applications targeted to the same device exceeds a second threshold, and
notify or disconnect the device from the network when the number of times of applications made by the same applicant exceeds the first threshold and the number of times of applications targeted to the same device exceeds the second threshold.

14. A management method comprising:
accepting an application intended not to change a software configuration of a device; and
denying the application based on a number of times of accepted applications,
wherein the accepted application is targeted to a plurality of devices that are similar to each other, and
based on a difference number of times that is a difference between the number of times of applications targeted to one device of the plurality of devices and the number of times of applications targeted to another device of the plurality of devices, denying the application targeted to the one device.

15. A non-transitory storage medium storing a program that causes a computer to:
accept an application intended not to change a software configuration of a device; and
deny the application based on a number of times of accepted applications,
wherein the accepted application is targeted to a plurality of devices that are similar to each other, and
based on a difference number of times that is a difference between the number of times of applications targeted to one device of the plurality of devices and the number of times of applications targeted to another device of the plurality of devices, deny the application targeted to the one device.

* * * * *